(12) United States Patent
Ghouti et al.

(10) Patent No.: US 8,139,765 B2
(45) Date of Patent: Mar. 20, 2012

(54) ELLIPTICAL POLYNOMIAL-BASED MESSAGE AUTHENTICATION CODE

(75) Inventors: Lahouari Ghouti, Dhahran (SA); Mohammad K. Ibrahim, Leicester (GB)

(73) Assignee: King Fahd University of Petroleum & Minerals, Dhahran (SA)

( * ) Notice: Subject to any disclaimer, the term of this patent is extended or adjusted under 35 U.S.C. 154(b) by 699 days.

(21) Appl. No.: 12/318,405

(22) Filed: Dec. 29, 2008

(65) Prior Publication Data
US 2010/0166176 A1   Jul. 1, 2010

(51) Int. Cl.
*H04L 29/06*   (2006.01)
(52) U.S. Cl. ............ 380/28; 380/29; 708/200; 708/490; 708/492; 713/168; 713/170; 713/181
(58) Field of Classification Search .................... 380/28, 380/29; 708/100, 200, 490, 492; 713/168, 713/170, 181
See application file for complete search history.

(56) References Cited

U.S. PATENT DOCUMENTS

| | | | |
|---|---|---|---|
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 6,816,594 B1 | 11/2004 | Okeya | |
| 6,873,706 B1* | 3/2005 | Miyazaki et al. | 380/30 |
| 7,117,424 B2* | 10/2006 | Sundaram et al. | 714/781 |
| 7,483,533 B2* | 1/2009 | Ibrahim | 380/44 |
| 7,483,534 B2* | 1/2009 | Ibrahim | 380/44 |
| 7,853,796 B2* | 12/2010 | Volkovs et al. | 713/181 |
| 7,961,874 B2* | 6/2011 | Ibrahim | 380/28 |
| 2003/0072443 A1 | 4/2003 | Harley et al. | |
| 2007/0088961 A1* | 4/2007 | Asano et al. | 713/193 |
| 2009/0136025 A1* | 5/2009 | Kargl et al. | 380/30 |
| 2009/0214025 A1* | 8/2009 | Golic | 380/28 |
| 2010/0166174 A1* | 7/2010 | Ghouti et al. | 380/28 |
| 2010/0166175 A1* | 7/2010 | Ghouti et al. | 380/28 |
| 2010/0169644 A1* | 7/2010 | Ghouti et al. | 713/169 |
| 2010/0169658 A1* | 7/2010 | Ghouti et al. | 713/181 |
| 2010/0177890 A1* | 7/2010 | Ghouti et al. | 380/30 |
| 2011/0200185 A1* | 8/2011 | Ghouti et al. | 380/28 |
| 2011/0200186 A1* | 8/2011 | Ghouti et al. | 380/43 |
| 2011/0200187 A1* | 8/2011 | Ghouti et al. | 380/43 |
| 2011/0200188 A1* | 8/2011 | Ghouti et al. | 380/43 |
| 2011/0202773 A1* | 8/2011 | Ghouti et al. | 713/183 |
| 2011/0208970 A1* | 8/2011 | Brown et al. | 713/176 |

OTHER PUBLICATIONS

Aydos, et al. "An Elliptic Curve Cryptography based Authentication and Key Agreement Protocol for Wireless Communication." 2nd International Workshop on Discrete Algorithms and Methods for Mobile Computing and Communications, Oct. 30, 1998.*
Gutub, et al. "Pipelining GF(P) Elliptic Curve Cryptography Computation." IEEE International Conference on Computer Systems and Applications, Mar. 8, 2006. pp. 93-99.*
Gutub, et al. "Power-Time Flexible Architecture for GF(2k) Elliptic Curve Cryptosystem Computation." GLSVLSI '03 Proceedings of the 13th ACM Great Lakes Symposium on VLSI, 2003. pp. 237-240.*
Ibrahim et al. "Bit-level pipelined digit serial GF(2m) multiplier." 2001 IEEE International Symposium on Circuits and Systems, May 2001. vol. 4, pp. 586-589.*
"Twisting an Elliptic Curve to Speed Up Cryptography"; http://www.cecs.csulb.edu/~englert/research/elliptic.pdf; 10 pages; printed on Jun. 10, 2008.

* cited by examiner

*Primary Examiner* — Nathan Flynn
*Assistant Examiner* — Sarah Su
(74) *Attorney, Agent, or Firm* — Richard C. Litman

(57) ABSTRACT

The elliptic-polynomial based Message Authentication Code (MAC) provides MAC generation methods based on the elliptic polynomial discrete logarithm problem. It is well known that an elliptic polynomial discrete logarithm problem is a computationally "difficult" or "hard" problem. The methods use both an elliptic polynomial and its twist, even if the polynomial and its twist are not isomorphic. Since both the polynomial and its twist are used, multiple x- and y-coordinates can be used to embed bit strings into a point that satisfies the elliptic polynomial, and the embedding process is non-iterative, so that the time required to embed the bit string is independent of the bit string content.

6 Claims, No Drawings

ELLIPTICAL POLYNOMIAL-BASED MESSAGE AUTHENTICATION CODE

BACKGROUND OF THE INVENTION

1. Field of the Invention

The present invention relates to computerized cryptographic methods for communications in a computer network or electronic communications system, and particularly to an elliptic polynomial-based message authentication code.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication: is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

In order to ensure message integrity, systems that depend on a shared secret key often rely upon message authentication codes (MACs). The MAC is uses the secret key and the message text to produce a bit string unique to the key and the text of the message, the bit string being appended to the message. The MAC bit string is usually compressed to a fixed number of bits, so that it is much shorter than the message text. When a recipient is able to use his secret key and the text message to generate a MAC that is identical to the MAC appended to the message, the recipient can be confident in the integrity of the message, i.e., that the message has not been altered.

A number of encryption techniques have been used to generate MACs. Some MACs are generated using block ciphers, such as the MAC made with DES. Such MACs, however, are vulnerable to brute force attacks. Other MACs are generated using hash functions, such as MD5, RIPEMD-160, SHA-1, etc. One popular MAC is HMAC, which combines a secret key with a non-keyed hash function, such as SHA-1 or MD5. However, such MACs rely upon the invulnerability of the hash function for their security against various forms of attack. However, the security of such hash functions against attacks has come into question because of successful attacks and evidence of their vulnerability to collisions. None of the current MAC generation algorithms incorporate a hash function that is based upon a mathematically hard problem, and particularly not the elliptic polynomial discrete logarithm problem.

Thus, an elliptic polynomial-based message authentication code solving the aforementioned problems is desired.

SUMMARY OF THE INVENTION

The elliptic-polynomial based Message Authentication Code (MAC) provides MAC generation methods based on the elliptic polynomial discrete logarithm problem. It is well known that an elliptic polynomial discrete logarithm problem is a computationally "difficult" or "hard" problem. The methods use both an elliptic polynomial and its twist, even if the polynomial and its twist are not isomorphic. Since both the polynomial and its twist are used, multiple x- and y-coordinates can be used to embed bit strings into a point that satisfies the elliptic polynomial, and the embedding process is non-iterative, so that the time required to embed the bit string is independent of the bit string content.

These and other features of the present invention will become readily apparent upon further review of the following specification and drawings.

DETAILED DESCRIPTION OF THE PREFERRED EMBODIMENTS

The elliptic polynomial-based Authentication Code (MAC) provides MAC generation methods based on the elliptic polynomial discrete logarithm problem. It is well known that an elliptic polynomial discrete logarithm problem is a computationally "difficult" or "hard" problem.

The MACs to be described below use elliptic polynomials in their generation, where different elliptic polynomials are used for different blocks of the same plaintext. Particularly, the MACs use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space, and, as will be described in detail below, the method makes use of elliptic polynomials where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomial equation. Given that nx additional x-coordinates are used, with nx being greater than or equal to one, a resulting elliptic point has (nx+1) x-coordinates, where all coordinates are elements of the finite field F. The number of points which satisfy an elliptic polynomial equation with nx additional x-coordinates defined over F and which can be used in the corresponding cryptosystem is increased by a factor of $(\#F)^{nx}$, where # denotes the size of a field.

Through the use of this particular method, security is increased through the usage of different elliptic polynomials for different message blocks during the generation of a message authentication code. Further, each elliptic polynomial used for each message block is selected at random, preferably using an initial value and a random number generator.

Given the form of the elliptic polynomial equation described above, the elliptic polynomial and its twist are isomorphic with respect to one another. The method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial.

The difficulty of using conventional elliptic polynomial cryptography to develop MACs typically lies in the iterative and non-deterministic method needed to embed a bit string into an elliptic polynomial point, which has the drawback of the number of iterations needed being different for different bit strings which are being embedded. As a consequence, different calculation times are required for different blocks of bit strings. Such a data-dependant generation time is not suitable for generating MACs, which require data independent encryption time. Further, with regard to iterative and non-deterministic methods in conventional elliptic polynomial, cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the elliptic polynomial MACs to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

Further, projective coordinates are used at the sending and receiving entities in order to eliminate inversion or division during each point addition and doubling operation of the scalar multiplication. It should be noted that all of the elliptic polynomial cryptography-based MACs disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by $(i+j+k)$. Further, in the following, the symbol $\epsilon$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the polynomial is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0, \ldots, nx\}$), and letting $S_{ny}$ represents the set of numbers from 0 to ny (i.e., $S_{ny}=\{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \sum_{k \in S_{ny}, l \in S_{nx}} c_{2kli} y_k x_l + \sum_{k \in S_{ny}, l,i \in S_{nx}} c_{3kli} y_k x_l x_i = \sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c, \quad (1)$$

where $a_{1l}, a_{2kl}, a_{3k}, c_{1lki}, c_{2kl}, c_{3kli}, b_{1l}, b_{2lk}, b_{3lk}, b_{4k}$ & $b_c \in F$.

Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 x_1 + x_0 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$ for F, wherein a set of points $EC^{nx+ny+2}$ is defined as the (nx+ny+2)–tuple $(x_0, x_1, \ldots, x_{nx}, y_0, y_1, \ldots, y_{ny})$, where $x_i, Y_k \in F$, $i \in S_{nx}$ and $k \in S_{ny}$. This set of points comprises solutions of F, although excluding the point $(0, 0, \ldots, 0)$ and the point at infinity, $(x_{0,I}, x_{1,I}, \ldots, x_{nx,I}, y_{0,I}, y_{1,I}, \ldots, y_{ny,I})$.

The rules for conventional elliptic polynomial point addition may be adopted to define an additive binary operation, "+", over $EC^{nx+ny+2}$, i.e., for all $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, the sum:

$(x_{0,3}, x_{1,3}, \ldots, x_{nx,3}, y_{0,3}, y_{1,3}, \ldots, y_{ny,3}) =$
$(x_{0,1}, x_{1,1}, \ldots, x_{nx,1}, y_{0,1}, y_{1,1}, \ldots, y_{ny,1}) +$
$(x_{0,2}, x_{1,2}, \ldots, x_{nx,2}, y_{0,2}, y_{1,2}, \ldots, y_{ny,2})$ is also $(x_{0,3}, x_{1,3}, \ldots x_{nx,3}, y_{0,3}, y_{1,3}, \ldots, y_{ny,3}) \in EC^{nx+ny+2}$.

As will be described in greater detail below, $(EC^{nx+ny+2}, +)$ forms a pseudo-group (p-group) over addition that satisfies the following axioms:

(i) There exists a set $(x_{0,I}, x_{1,I}, \ldots, x_{nx,I}, \ldots, y_{0,I}, y_{1,I}, \ldots, y_{ny,I}) \in EC^{nx+ny+2}$ such that $(x_0, x_1, \ldots, x_{nx}, y_0,$ $y_1, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny})$ for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that $(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,I}, x_{1,I}, \ldots, x_{nx,I}, y_{0,I}, y_{1,I}, \ldots, y_{ny,I})$ (iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_1, \ldots, x_{nx}, y_0, y_1, \ldots, y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1}, x_{1,1}, \ldots, x_{nx,1}, y_{0,1}, y_{1,1}, \ldots, y_{ny,1})$ and $(x_{0,2}, x_{1,2}, \ldots, x_{nx,2}, y_{0,2}, y_{1,2}, \ldots, y_{ny,2})$ is given by:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

If the point $(x_{0,1}'', x_{1,1}'', \ldots, x_{nx,1}'', y_{0,1}'', y_{1,1}'', \ldots, y_{ny,1}'')$ is equivalent to the point $(x_{0,1}, x_{1,1}, \ldots, x_{nx,1}, y_{0,1}, y_{1,1}, \ldots, y_{ny,1})$, then the former can be substituted for $(x_{0,1}, x_{1,1}, \ldots, x_{nx,1}, y_{0,1}, y_{1,1}, \ldots, y_{ny,3})$ in the above equation in order to obtain:

$$(x_{0,3}, x_{1,3}, \ldots, x_{nx,3}, y_{0,3}, y_{1,3}, \ldots, y_{ny,3}) = (x_{0,1}'', x_{1,1}'', \ldots, x_{nx,1}'', y_{0,1}'', y_{1,1}'', \ldots, y_{ny,1}'') + (x_{0,2}, x_{1,2}, \ldots, x_{nx,2}, y_{0,2}, y_{1,2}, \ldots, y_{ny,2})$$

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition operation of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, otherwise expressed as:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is calculated in the following manner. First, a straight line is drawn which passes through the two points to be added. The straight line intersects $EC^{nx+ny+2}$ at a third point, which we denote $(x_{0,3}', x_{1,3}', \ldots, x_{nx,3}', y_{0,3}', y_{1,3}', \ldots, y_{ny,3}') \in EC^{nx+ny+2}$. The sum point is defined as $(x_{0,3}, x_{1,3}, \ldots, x_{nx,3}, y_{0,3}, y_{1,3}, \ldots, y_{ny,3}) = -(x_{0,3}', x_{1,3}', \ldots, x_{nx,3}', y_{0,3}', y_{1,3}', \ldots, y_{ny,3}')$.

From the above definition of the addition rule, addition over $EC^{nx+ny+2}$ is commutative, that is:

$$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$$

for all $(x_{0,1}, x_{1,1}, \ldots, x_{nx,1}, y_{0,1}, y_{1,1}, \ldots, y_{ny,1}) \in EC^{nx+ny+2}$ and for all $(x_{0,2}, x_{1,2}, \ldots, x_{nx,2}, y_{0,2}, y_{1,2}, \ldots, y_{ny,2}) \in EC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}, x_{j,1} \neq x_{j,2}$; and (B) for all $j \in S_{nx}, x_{j,1} = x_{j,2} = x_{j,0}$. Case B includes three sub-cases:

i. for all $k \in S_{ny}, y_{k,1} = y_{k,2}$, that is:

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2}),$$

which corresponds to point doubling;

ii. for $k \in S_{ny}$ & $k \neq 0$, $y_{k,1} = y_{k,2}$, and where $y_{0,1}$ & $y_{0,2}$ are the roots of the following quadratic equation in $y_0$:

$$a_{10}y_0^2 + \sum_{k \in S_{ny}, k \neq 0} a_{1k}y_{k,1}^2 + y_0 \left\{ \sum_{k \in S_{ny}, k \neq 0} a_{2k0}y_{k,1} + \sum_{l \in S_{ny}, l \neq 0} a_{20l}y_{l,1} \right\} +$$
$$\sum_{k,l \in S_{ny}, l \neq k, l \& k \neq 0} a_{2kl}y_{k,1}y_{l,1} + a_{30}y_0 + \sum_{k \in S_{ny}, k \neq 0} a_{3k}y_{k,1} +$$
$$y_0^2 \sum_{i \in S_{nx}} c_{100i}x_{i,1} + y_0 \left\{ \sum_{k \in S_{ny}, i \in S_{nx}} c_{1k0i}y_{k,1}x_{i,1} + \sum_{l \in S_{ny}, i \in S_{nx}} c_{10li}y_{l,1}x_{i,1} \right\} +$$
$$\sum_{k,l \in S_{ny}, l \& k \neq 0, i \in S_{nx}} c_{1kli}y_{k,1}y_{l,1}x_{i,1} + y_0 \sum_{l \in S_{nx}} c_{20l}x_{l,1} +$$
$$\sum_{k \in S_{ny}, k \neq 0, l \in S_{nx}} c_{2kl}y_{k,1}x_{l,1} + y_0 \sum_{l,i \in S_{nx}} c_{30li}x_{l,1}x_{i,1} +$$
$$\sum_{k \in S_{ny}, k \neq 0, l,i \in S_{nx}} c_{3kli}y_{k,1}x_{l,1}x_{i,1} = \sum_{l \in S_{nx}} b_{1l}x_{l,1}^3 +$$
$$\sum_{l,k \in S_{nx}, l \neq k} b_{2lk}x_{l,1}^2 x_{k,1} + \sum_{l,k \in S_{nx}} b_{3lk}x_{l,1}x_{k,1} + \sum_{k \in S_{nx}} b_{4k}x_{k,1} + b_c,$$

which corresponds to point inverse; and iii. all other conditions except those in Cases B.i and B.ii. This case occurs only when ny is greater than or equal to one.

For Case A, for at least one $j \in S_{nx}$ $x_{j,1} \neq x_{j,2}$, a straight line in (nx+ny+2)-dimensional space is defined by $$\frac{y_k - y_{k,1}}{y_{k,2} - y_{k,1}} = \frac{x_j - x_{j,1}}{x_{j,2} - x_{j,1}}, k \in S_{ny}$$

and
$j \in S_{nx}$ and $$\frac{x_i - x_{i,1}}{x_{i,2} - x_{i,1}} = \frac{x_j - x_{j,1}}{x_{j,2} - x_{j,1}}, i \neq j, i \in S_{nx}.$$

For this case, $y_k = m_{yk}x_j + c_{yk}$, where $$m_{yk} = \frac{y_{k,2} - y_{k,1}}{x_{j,2} - x_{j,1}}$$

and $c_{yk} = y_{k,1} - x_{j,1}m_{yk}$.

Further, $x_i = m_{xi}x_j + c_{xi}$, where $$m_{xi} = \frac{x_{i,2} - x_{i,1}}{x_{j,2} - x_{j,1}}$$

and $c_{xi}=x_{i,1}-x_{j,1}m_{xi}$. Equation (1) can then be re-written as:

$$\sum_{k\in S_{ny}} a_{1k}y_k^2 + \sum_{k,l\in S_{ny},l\neq k} a_{2kl}y_k y_l + \sum_{k\in S_{ny}} a_{3k}y_k +$$

$$x_j \sum_{k,l\in S_{ny}} c_{1klj}y_k y_l + \sum_{k,l\in S_{ny},i\in S_{nx},i\neq j} c_{1kli}y_k y_l x_i + x_j \sum_{k\in S_{ny}} c_{2kj}y_k +$$

$$\sum_{k\in S_{ny},l\in S_{nx},l\neq j} c_{2kl}y_k x_l + x_j^2 \sum_{k\in S_{ny}} c_{3kjj}y_k + x_j \sum_{k\in S_{ny},l\in S_{nx},l\neq j} c_{3klj}y_k x_l +$$

$$x_j \sum_{k\in S_{ny},i\in S_{nx},i\neq j} c_{3kji}y_k x_i + \sum_{k\in S_{ny},l,i\in S_{nx},l\&i\neq j} c_{3kli}y_k x_l x_i =$$

$$b_{1j}x_j^3 + \sum_{l\in S_{nx},l\neq j} b_{1l}x_l^3 + x_j^2 \sum_{k\in S_{nx},k\neq j} b_{2jk}x_k + x_j \sum_{l\in S_{nx},l\neq j} b_{2lj}x_l^2 +$$

$$\sum_{l,k\in S_{nx},l,k\neq j,l\neq k} b_{2lk}x_l^2 x_k + b_{3jj}x_j^2 + x_j \sum_{k\in S_{nx},k\neq j} b_{3jk}x_k +$$

$$x_j \sum_{l\in S_{nx},l\neq j} b_{3lj}x_l + \sum_{l,k\in S_{nx},l,k\neq j} b_{3lk}x_l x_k + b_{4j}x_j + \sum_{k\in S_{nx},k\neq j} b_{4k}x_k + b_c,$$

and substitution of the above into the rewritten equation (1) for $y_k$, $k\in S_{ny}$ and $x_i$, $i\in S_{nx}$ & $i\neq j$, results in:

$$\sum_{k\in S_{ny}} a_{1k}(m_{yk}x_j+c_{yk})^2 + \sum_{k,l\in S_{ny},l\neq k} a_{2kl}(m_{yk}x_j+c_{yk})(m_{yl}x_j+c_{yl}) +$$

$$\sum_{k\in S_{ny}} a_{3k}(m_{yk}x_j+c_{yk}) + x_j \sum_{k,l\in S_{ny}} c_{1klj}(m_{yk}x_j+c_{yk})(m_{yl}x_j+c_{yl}) +$$

$$\sum_{k,l\in S_{ny},i\in S_{nx},i\neq j} c_{1kli}(m_{yk}x_j+c_{yk})(m_{yl}x_j+c_{yl})(m_{xi}x_j+c_{xi}) +$$

$$x_j \sum_{k\in S_{ny}} c_{2kj}(m_{yk}x_j+c_{yk}) + \sum_{k\in S_{ny},l\in S_{nx},l\neq j} c_{2kl}(m_{yk}x_j+c_{yk})(m_{xl}x_j+c_{xl}) +$$

$$x_j^2 \sum_{k\in S_{ny}} c_{3kjj}(m_{yk}x_j+c_{yk}) +$$

$$x_j \sum_{k\in S_{ny},l\in S_{nx},l\neq j} c_{3klj}(m_{yk}x_j+c_{yk})(m_{xl}x_j+c_{xl}) +$$

$$x_j \sum_{k\in S_{ny},i\in S_{nx},i\neq j} c_{3kji}(m_{yk}x_j+c_{yk})(m_{xi}x_j+c_{xi}) +$$

$$\sum_{k\in S_{ny},l,i\in S_{nx},l\&i\neq j} c_{3kli}(m_{yk}x_j+c_{yk})(m_{xl}x_j+c_{xl})(m_{xi}x_j+c_{xi}) =$$

$$b_{1j}x_j^3 + \sum_{l\in S_{nx},l\neq j} b_{1l}(m_{xl}x_j+c_l)^3 + x_j^2 \sum_{k\in S_{nx},k\neq j} b_{2jk}(m_{xk}x_j+c_{xk}) +$$

$$x_j \sum_{l\in S_{nx},l\neq j} b_{2lj}(m_{xl}x_j+c_{xl})^2 +$$

$$\sum_{l,k\in S_{nx},l\&k\neq j,l\neq k} b_{2lk}(m_{xl}x_j+c_{xl})^2(m_{xk}x_j+c_{xk}) + b_{3jj}x_j^2 +$$

$$x_j \sum_{k\in S_{nx},k\neq j} b_{3jk}(m_{xk}x_j+c_{xk}) + x_j \sum_{l\in S_{nx},l\neq j} b_{3lj}(m_{xl}x_j+c_{xl}) +$$

$$\sum_{l,k\in S_{nx},l\&k\neq j} b_{3lk}(m_{xl}x_j+c_{xl})(m_{xk}x_j+c_{xk}) +$$

$$b_{4j}x_j + \sum_{k\in S_{nx},k\neq j} a_{6k}(m_{xk}x_j+c_{xk}) + b_c$$

Expanding the terms in the above equation leads to a cubic equation of the form $x_j$, $c_3 x_j^3 + C_2 x_j^2 + C_1 x_j + C_0 = 0$, where $C_3$, $c_2$, $c_1$ & $C_0$ are obtained from the above equation.

Assuming $C_3 \neq 0$, the above cubic equation in $x_j$ has three roots $x_{j,1}, x_{j,2}$, & $x_{j,3}'$ and can be written as $(x_j-x_{j,1})(x_j-x_{j,2})$ $(x_j-x_{j,3}')=0$. Normalizing by the coefficient of $x^3$ and equating the coefficients of $x^2$ in the resulting equation with that in $(X_j-x_{j,1})(x_j-x_{j,2})(x_j-x_{j,3}')=0$, one obtains a solution for $x_{j,3}'$:

$$x_{j,3}' = \frac{-C_2}{C_3} - x_{j,1} - x_{j,2}. \qquad (2)$$

The values of $y_{k,3}'$, $k\in S_{ny}$, and $x_{i,3}$, $i\in S_{nx}$ & $i\neq j$, may be similarly obtained from equations for $x_j=x_{j,3}'$.

For cases where $C_3=0$, $c_3 x_j^3 + C_2 x_j^2 + C_1 x_j + C_0 = 0$ becomes a quadratic equation. Such quadratic equations may be used in the definition of point equivalences.

With regard to Case B for all $j\in S_{nx}$, $x_{j,1}=x_{j,2}$, the three sub-cases are considered below. In all cases, $x_{j,0}$ is defined as $x_{j,0}=x_{j,1}=x_{j,2}$, $j\in S_{nx}$.

For Case B.i., all $k\in S_{ny}$, $y_{k,1}=y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$ Letting:

$$(x_{0,o}, x_{1,o}, \ldots, x_{nx,o}, y_{0,o}, y_{1,o}, \ldots, y_{ny,o}) = (x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$$

the sum is written as $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,o}, x_{1,o}, \ldots, x_{nx,o}, y_{0,o}, y_{1,o}, \ldots, y_{ny,o}) \qquad (3).$$

There are several ways of defining the addition in this case. Three possible rules are described below. Case B.i.1: Letting $S_{nx,Lx}$ denote a subset of $S_{nx}$ with Lx elements, i.e., $S_{nx,Lx} \subset S_{nx}$; letting $S_{ny,Ly}$ denote a subset of $S_{ny}$ with Ly elements and which does not include the element 0; i.e. $S_{ny,Ly} \subset S_{ny}$ and $1\notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n\in S_{ny,Ly}$ and $m\in S_{nx,Lx}$.

In this case, the gradients $m_{yn}$ and $m_{xm}$ n of the straight line to be used in equation (2) are essentially the first derivatives of $y_n$ and $x_m$, $n\in S_{ny,Ly}$ and $m\in S_{nx,Lx}$, for F with respect to $x_j$, $j\in S_{nx,Lx}$ i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n\in S_{ny,Ly}$, and $$m_{xn} = \frac{dx_m}{dx_j},$$

where $M \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0, \text{ for } n \in (S_{ny} - S_{ny,Lx}),$$

then a solution for $x_{j,3}'$ may be obtained.

The values of $y_{n,3}'$ for $n \in S_{ny}$ and $x_{m,3}'$ for $m \in S_{nx}$ & $m \neq j$, can further be obtained for $x_j = x_{j,3}'$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$ and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as:

$$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,oe}, x_{1,oe}, \ldots, x_{nx,oe}, y_{0,oe}, y_{1,oe}, \ldots, y_{ny,oe}).$$

With regard to Case B.ii, for $k \in S_{ny}$ & $k \neq 0, y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points, such as the point $(x_{0,o}, x_{1,o}, \ldots, x_{nx,o}, y_{0,1}, y_{1,o}, \ldots, y_{ny,o}) \in EC^{nx+ny+2}$ and the point $(x_{0,o}, x_{1,o}, \ldots, x_{nx,o}, y_{0,2}, y_{1,o}, \ldots, y_{ny,o}) \in EC^{nx+ny+2}$, are in the hyper-plane with $x_i = x_{i,o}, i \in S_{nx}$ and $y_k = y_{k,o}, k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $x_{0,o}, x_{1,o}, \ldots, x_{nx,o}, y_{1,o}, \ldots,$ & $y_{ny,o}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,I}, x_{1,I}, \ldots, x_{nx,I}, y_{0,I}, y_{1,I}, \ldots, y_{ny,I}) \in EC^{nx+ny+2}$. This point at infinity is used to define both the inverse of a point in $EC^{nx+ny+2}$ and the identity point. According to the addition rule defined above, one can write:

$$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,I}, x_{1,I}, \ldots, x_{nx,I}, y_{0,I}, y_{1,I}, \ldots, y_{ny,I}) \quad (4)$$

since the third point of intersection of such lines is assumed to be at infinity, $(x_{0,I}, x_{1,I}, \ldots, x_{nx,I}, y_{0,I}, y_{1,I}, \ldots, y_{ny,I}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$$-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny}).$$

Thus, equation (4) can be written as:

$$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,I}, x_{1,I}, \ldots, x_{nx,I}, y_{0,I}, y_{1,I}, \ldots, y_{ny,I}) \quad (5).$$

Further, a line joining the point at infinity $(x_{0,I}, x_{1,I}, \ldots, x_{nx,I}, y_{0,I}, y_{1,I}, \ldots, y_{ny,I}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, y_2, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$.

There are several possible rules to find the sum point in this case. Three possible methods are given below.

1) Using three point doublings and one point addition, $$(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2});$$

2) using one point doublings and three point additions, $$(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1});$$ and 3) using point equivalence, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e}),$$

where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2},+)$ is as follows: Given particular elliptic polynomial equations (i.e., for particular coefficients $a_{1l}, a_{2kl}, a_{3k}, c_{1lki}, c_{2kl}, c_{3kli}, b_{1l}, b_{2lk}, b_{3lk}, b_{4k}, b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2},+)$, then the corresponding $EC^{nx+ny+2}$ groups based on such polynomials are associative. This is because any-three points $Q, R, S \in EC^{nx+ny+2}$ (or any of their equivalent points) can be written as $k_Q P, k_R P, k_S P \in EC^{nx+ny+2}$, respectively, thus their sum $(Q+R+S) = (k_Q P + k_R P + k_S P) = (k_Q + k_R + k_S)P$, can be carried out in any order.

The following elliptic polynomial equation with nx=1 and ny=0 is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $x_1$, one obtains $(m_{y0} x_0 + c_{y0})^2 = x_0^3 + (m_{x1} x_0 + c_{x1})^3 + x_0 (m_{x1} x_0 + c_{x1})$.

Expanding this equation yields the equation $m_{y0}^2 x_0^2 + 2 m_{y0} c_{y0} x_0 + c_{y0}^2 = x_0^3 + m_{x1}^3 x_0^3 + 3 m_{x1}^2 c_{x1}^2 + 3 m_{x1} c_{x1}^2 x_0 + c_{x1}^3 + m_{x1} x_0^2 + c_{x1} x_0$, or $(1+m_{x1}^3) x_0^3 + (3 m_{x1}^{2c}{}_{x1} + m_{x1} - m_{y0}^2) x_0^2 + (3 m_{x1} c_{x1}^2 + c_{x1} - 2 m_{y0} c_{y0}) x_0 + c_{x1}^3 - c_{y0}^2 = 0$. From equation (2), the solution for $x_{0,3}'$ in this case is obtained:

$$x'_{0,3} = \frac{-(3m_{x1}^2 c_{x1} + m_{x1} - m_{y0}^2)}{(1+m_{x1}^3)} - x_{j,1} - x_{j,2}.$$

Similarly, one can obtain the values of $y_{0,3}$ and $x_{1,3}$ for $X_0 = x_{0,3}$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \tag{7}$$

for $i \in S_{nx}$;
and;
and $$y_k = \frac{Y_k}{V^3} \text{ for } k \in S_{ny}. \tag{8}$$

Using Jacobian projection yields:

$$\sum_{k \in S_{ny}} a_{1k} \frac{Y_k^2}{V^6} + \sum_{k,l \in S_{ny}, l \ne k} a_{2kl} \frac{Y_k}{V^3} \frac{Y_l}{V^3} + \sum_{k \in S_{ny}} a_{3k} \frac{Y_k}{V^3} + \tag{9}$$

$$\sum_{k,l \in S_{ny}, i \in S_{nx}} c_{1kli} \frac{Y_k}{V^3} \frac{Y_l}{V^3} \frac{X_i}{V^2} + \sum_{k \in S_{ny}, l \in S_{nx}} c_{2kl} \frac{Y_k}{V^3} \frac{X_l}{V^2} +$$

$$\sum_{k \in S_{ny}, l,i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{l,k \in S_{nx}, l \ne k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \ne k} a_{2kl} Y_k Y_l V^2 + \tag{10}$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k \in S_{ny}, l \in S_{nx}} c_{2kl} Y_k X_l V^3 + \sum_{k \in S_{ny}, l,i \in S_{nx}} c_{3kli} Y_k X_l X_i V =$$

$$\sum_{l \in S_{nx}} b_{1l} X_l^3 V^2 + \sum_{l,k \in S_{nx}, l \ne k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \ne 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) = \left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \tag{11}$$

$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$

$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using Jacobian projective coordinates in the equations of Cases A and B above, and by an appropriate choice of the value of $V_3$, it can be shown that point doubling and point addition can be computed without the need for field inversion or division.

One example of an elliptic polynomial and its twist is given below. Writing the cubic equation with two variables in x-coordinates and one variable in y-coordinates defined over a finite field F yields:

$$t = x_1^3 + a x_2^3 + b x_1 x_2 + c \tag{12}$$

where $x_1$ & $x_2 \in F$ $t \in F$ and a, b & $c \in F$. Any value of $x_1, x_2$ will lead to a value of $t \in F$. It should be noted that t could be quadratic residue or non-quadratic residue. If t is quadratic residue, it can be written as $t = y^2$, and if t is non-quadratic residue, it can be written as $t = \overline{\alpha} y^2$, where $\overline{\alpha}$ is a non-quadratic element of F; i.e., $\sqrt{\overline{\alpha}} \notin F$. Therefore, equation (12) can be written as:

$$\alpha y^2 = x_1^3 + a x_2^3 + b x_1 x_2 + c \tag{13}$$

where $$\begin{cases} \alpha = 1 & \text{if } t \text{ is } quadratic\,residue \\ \alpha = \overline{\alpha} & \text{if } t \text{ is non-} quadratic\,residue \end{cases}.$$

It should be noted that for specific coefficient a, b & $c \in F$, when $\alpha = 1$, the resulting polynomial is an elliptic polynomial. However, if $\alpha = \overline{\alpha}$ this leads to a twist of the elliptic polynomial obtained with $\alpha = 1$.

Any value of $x_1$ & $x_2 \in F$ will lead to a point $(x_1, x_2, \sqrt{\alpha}y)$, which is either on an elliptic polynomial or its twist. If $\alpha=1$, the point $(x_1, x_2, \sqrt{\alpha}y)$ is on the elliptic polynomial. If $\alpha=\overline{\alpha}$, the point $(x_1, x_2, \sqrt{\alpha}y)$ is on its twist.

Elliptic point addition can be formulated on a twist of an elliptic polynomial in the same fashion as it is formulated for elliptic polynomials and described above. As a result, elliptic polynomial cryptography can also be defined on twists of elliptic polynomial in the same fashion as that described above.

In the following MAC generation methods, a shared secret key or keys are used to generate the MAC of the message data bits.

In a first embodiment, the MAC generation method includes the following steps:

a) defining a maximum block size that can be embedded into (nx+1) x-coordinates and ny y-coordinates, wherein nx and ny are integers, and setting the maximum block size to be (nx+ny+1)N bits, wherein N is an integer, and defining the number of (nx+ny+1)N-bit blocks in a message bit string to be (u+1), wherein u is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field where the field's elements can be represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\overline{\alpha}}y_{0,B}, y_{1,TB}, \ldots, y_{ny,TB}) \in TEC^{xn+ny+2}$, wherein $TEC^{nx+ny+2}$ represents the twist of the elliptic polynomial $EC^{nx+ny+2}$, and further, $\overline{\alpha}$ is a non-quadratic residue element of F;

the sending correspondent then performs the following steps:

c) embedding the bit string of the secret key into the (nx+1) x-coordinates $x_0, x_1, \ldots, x_{nx}$, and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$ using a non-iterative embedding method to be described below;

d) if $(x_{0,k}, x_{1,k}, \ldots, x_{nx,k}, \sqrt{\alpha_k}y_{0,k}, y_{1,k}, \ldots, y_{ny,k})$ is on the elliptic polynomial, a scalar multiplication is computed as the equations:

$$(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = k(x_{0,TB}, x_{1,TB}, \ldots, x_{nx,TB}, \sqrt{\overline{\alpha}}y_{0,B}, y_{1,TB}, \ldots, y_{ny,TB})$$

and $(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, y_{0,k}, y_{1,k}, \ldots, y_{ny,k})$.

Otherwise, if $\alpha_k = \overline{\alpha}$, then the scalar multiplication is computed as:

$$(x_{0,S_0}, x_{1,S_0}, \ldots, x_{nx,S_0}, y_{0,S_0}, y_{1,S_0}, \ldots, y_{ny,S_0}) = k(x_{0,B}, x_{1,B}, \ldots, x_{nx,B}, y_{0,B}, y_{1,B}, \ldots, y_{ny,B})$$ and $$(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = (x_{0,k}, x_{1,k}, \ldots, x_{nx,k}, \sqrt{\alpha_k}y_{0,k}, y_{1,k}, \ldots, y_{ny,k});$$

e) dividing the message bit string into M-bit strings where $((nx+ny+1)N-L) > M > (N-L)$, where M and L are integers, and embedding the message bit string of the initial block of the message bit string into the (nx+1) x-coordinates and the ny y-coordinates of the elliptic message point $(x_{0,m_0}, x_{1,m_0}, \ldots, x_{nx,m_0}, \sqrt{\alpha}y_{0,m_0}, y_{1,m_0}, \ldots, y_{ny,m_0})$ using the non-iterative embedding method;

f) if the message point of the 0-th block is on the elliptic polynomial, then the message authentication code points are computed as $$(x_{0,c_0}, x_{1,c_0}, \ldots, x_{nx,c_0}, \sqrt{\alpha}y_{0,c_0}, y_{1,c_0}, \ldots, y_{ny,c_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,S_0}, x_{1,S_0}, \ldots, x_{nx,S_0}, \sqrt{\alpha}y_{0,S_0}, y_{1,S_0}, \ldots, y_{ny,S_0})$$

and $(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$.

Otherwise, they are computed as the equations:

$$(x_{0,Tc_0}, x_{1,Tc_0}, \ldots, x_{nx,Tc_0}, y_{0,Tc_0}, y_{1,Tc_0}, \ldots, y_{ny,Tc_0}) = (x_{0,m_0}, x_{1,m_0}, \ldots, x_{nx,m_0}, y_{0,m_0}, y_{1,m_0}, \ldots, y_{ny,m_0}) + (x_{0,TS_0}, x_{1,TS_0}, \ldots, x_{nx,TS_0}, y_{0,TS_0}, y_{1,TS_0}, \ldots, x_{ny,TS_0})$$ and $$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, y_{ny,S_0});$$

g) initializing an integer i as i=1, and repeating the following steps h) and i) until i>u:

h) embedding the message (nx+ny+1)N-bit string of an i-th block into the (nx+1) x-coordinates $x_0, x_1, \ldots, x_{nx}$ and the ny y-coordinates, $y_1, \ldots, y_{ny}$, of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using the non-iterative embedding method i) if the message point of the i-th block is on the elliptic polynomial, then the message authentication code points are computed as:

$$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$$ and $$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}}).$$

Otherwise, they are computed as $$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,m_i}, x_{1,m_i}, \ldots, x_{nx,m_i}, \sqrt{\overline{\alpha}}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$$ and $$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}});$$

j) a set of appropriate bits of the x-coordinates $x_{0,c}$, $x_{1,c}, \ldots, x_{nx,c}$, y-coordinates $y_{1,c}, \ldots, y_{ny,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_u})$ and a set of appropriate bits of the x-coordinates $x_{0,Tc}, x_{1,Tc} \ldots$ & $x_{nx,Tc}$, y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

k) embedding the bit string of the secret key into the (nx+1) x-coordinates $x_0, x_1, \ldots, x_{nx}$, and the ny y-coordinates $y_1, \ldots, y_{ny}$, of the key elliptic point $(x_{0,k}, x_{1,k}, \ldots, x_{nx,k}, \sqrt{\alpha_k}y_{0,k}, y_{1,k}, \ldots, y_{ny,k})$ using the non-iterative embedding method;

l) if the point $(x_{0,k}, x_{1,k}, \ldots, x_{nx,k}, \sqrt{\alpha_k}y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = k(x_{0,TB}, x_{1,TB}, \ldots, x_{nx,TB}, \sqrt{\overline{\alpha}}y_{0,B}, y_{1,TB}, \ldots, y_{ny,TB})$ and $(x_{0,S_0}, x_{1,S_0}, \ldots, x_{nx,S_0}, y_{0,S_0}, y_{1,S_0}, \ldots, y_{ny,S_0}) = (x_{0,k},$ $x_{1,k}, \ldots, x_{nx,k}, y_{0,k}, y_{1,k}, \ldots, y_{ny,k}$) otherwise if $\alpha_k=\alpha_o$ then the scalar multiplication is performed as $(x_{0,S_0}, x_{1,S_0}, \ldots, x_{nx,S_0}, y_{0,S_0}, y_{1,S_0}, \ldots, x_{ny,S_0})=k(x_{0,B}, x_{1,B}, \ldots, x_{nx,B}, y_{0,B}, y_{1,B}, \ldots, y_{ny,B})$ and $(x_{0,TS_0}, x_{1,TS_0}, \ldots, x_{nx,TS_0}, \sqrt{\alpha}y_{0,TS_0}, y_{1,TS_0}, \ldots, x_{ny,TS_0})=(x_{0,k}, x_{1,k}, \ldots, x_{nx,k}, \sqrt{\alpha}y_{0,k}, y_{1,k}, \ldots, y_{ny,k})$;

m) dividing the received message bit string into M-bit strings where $((nx+ny+1)N-L)>M>(N-L)$, where M and L are integers, and embedding the received message $(nx+ny+1)N$-bit string of the initial block of the received message bit string into the $(nx+1)$ x-coordinates and the ny y-coordinates of the received message elliptic point $(x_{0,rm_0}, x_{1,rm_0}, \ldots, x_{nx,rm_0}, \sqrt{\alpha_{rm_0}}y_{0,rm_0}, y_{1,rm_0}, \ldots, y_{ny,rm_0})$ using the non-iterative embedding method;

n) if the message point of the 0-th block is on the elliptic polynomial, then the message authentication points are computed as $(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, y_{ny,S_0})$ and $(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$. Otherwise, they are computed as:

$$(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,rm_0}, x_{1,rm_0}, \ldots, x_{nx,rm_0}, \sqrt{\alpha}y_{0,rm_0}, y_{1,rm_0}, \ldots, y_{ny,rm_0}) + (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$$ and $$(x_{0,rc_0}, x_{1,rc_0}, \ldots, x_{nx,rc_0}, y_{0,rc_0}, y_{1,rc_0}, \ldots, y_{ny,rc_0}) + (x_{0,S_0}, x_{1,S_0}, \ldots, x_{nx,S_0}, y_{0,S_0}, y_{1,S_0}, \ldots, x_{ny,S_0})$$

o) initializing the integer i as i=0, the following steps p) and q) are repeated until i>u:

p) embedding the received message $(nx+ny+1)N$-bit string of the i-th block the into the $(nx+1)$ x-coordinates $x_0, x_1, \ldots, x_{nx}$, and the ny y-coordinates $y_1, \ldots, y_{ny}$ of the received message elliptic point $(x_{0,rm_i}, x_{1,rm_i}, \ldots, x_{nx,rm_i}, \sqrt{\alpha_{rm_i}}y_{0,rm_i}, y_{1,rm_i}, \ldots, y_{ny,rm_i})$ using the non-iterative embedding method;

q) if the received message point of the i-th block is on the elliptic polynomial, then the message authentication points are computed as $$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i}, x_{1,rm_i}, \ldots, x_{nx,rm_i}, y_{0,rm_i}, y_{1,rm_i}, \ldots, y_{ny,rm_i}) + (x_{0,rc_{i-1}}, x_{1,rc_{i-1}}, \ldots, x_{nx,rc_{i-1}}, y_{0,rc_{i-1}}, y_{1,rc_{i-1}}, \ldots, x_{ny,rc_{i-1}})$$

and $(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$, otherwise they are computed as $$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rm_i}, x_{1,rm_i}, \ldots, x_{nx,rm_i}, \sqrt{\alpha}y_{0,rm_i}, y_{1,rm_i}, \ldots, y_{ny,rm_i}) + (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, y_{ny,rTc_{i-1}})$$

and $(x_{0,rc_i}, x_{1,rc_i}, \ldots, x_{nx,rc_i}, y_{0,rc_i}, y_{1,rc_i}, \ldots, y_{ny,rc_i}) = (x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}})$ r) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_u})$, and the appropriate bits of the x-coordinates $x_{0,rTc}, x_{1,rTc}, \ldots, x_{nx,rTC}$, y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, \sqrt{\alpha}y_{0,rTc_u}, y_{1,rTc_u}, \ldots, y_{ny,rTc_u})$ are concatenated together to form the message authentication code of the received message; and s) if the received message authentication code is equal to the message authentication code of the received message generated at the receiving correspondent, the received message is authenticated.

In an alternative embodiment, the MAC generation method includes the following steps:

a) defining a maximum block size that can be embedded into $(nx+1)$ x-coordinates and ny y-coordinates, wherein n is an integer, and setting the maximum block size to be $(nx+ny+1)N$ bits, wherein N is an integer, and defining the number of $(nx+ny+1)N$-bit blocks in a message bit string to be $(u+1)$, wherein u is an integer;

b) a sending correspondent and a receiving correspondent agree upon the values of nx and ny, where nx and ny are integers, and further agree on a set of coefficients $a_{1k}, a_{2kl}, a_{3k}, c_{1kli}, c_{2kl}, c_{3kli}, b_{1l}, b_{2lk}, b_{3lk}, b_{4k}$ & $b_c \in F$, wherein F represents a finite field and where the elements of F are represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{xn+ny+2}$, wherein $TEC^{nx+ny+2}$ represents the twist of the elliptic polynomial $EC^{nx+ny+2}$, and where $\overline{\alpha}$ is a non-quadratic-residue element of F;

the sending correspondent then performs the following steps:

c) embedding the bit string of the secret key into the $(nx+1)$ x-coordinates $x_0, x_1, \ldots, x_{nx}$, and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$ using a non-iterative embedding method to be described below;

d) if $(x_{0,k}, x_{1,k}, \ldots, x_{nx,k}, \sqrt{\alpha_k}y_{0,k}, y_{1,k}, \ldots, y_{ny,k})$ is on the elliptic polynomial, a scalar multiplication is computed as:

$$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$$

and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, otherwise, if $\alpha_k = \overline{\alpha}$ then the scalar multiplication is computed as:

$$(x_{0,S_0}, x_{1,S_0}, \ldots, x_{nx,S_0}, y_{0,S_0}, y_{1,S_0}, \ldots, x_{ny,S_0}) = (x_{0,B}, x_{1,B}, \ldots, x_{nx,B}, y_{0,B}, y_{1,B}, \ldots, y_{ny,B})$$ and $$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) + (x_{0,k}, x_{1,k}, \ldots, x_{nx,k}, \sqrt{\alpha}y_{0,k}, y_{1,k}, \ldots, y_{ny,k});$$

e) dividing the message bit string into M-bit strings where $((nx+ny+1)N-L)>M>(N-L)$, where M and L are integers, and embedding the message bit string of the initial block of the message bit string into the $(nx+1)$ x-coordinates and the ny y-coordinates of the elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$ using the non-iterative embedding method;

f) if the message point of the 0-th block is on the elliptic polynomial, then the message authentication code points are computed as $$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, x_{ny,S_0})$$

and $(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$. Otherwise, they are computed as:

$$(x_{0,Tc_0}, x_{1,Tc_0}, \ldots, x_{nx,Tc_0}, \sqrt{\alpha}y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha}y_{0,m_0}, y_{1,m_0}, \ldots, y_{ny,m_0}) + (x_{0,TS_0}, x_{1,TS_0}, \ldots, x_{nx,TS_0}, \sqrt{\alpha}y_{0,TS_0}, y_{1,TS_0}, \ldots, y_{ny,TS_0})$$

and $$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0});$$

g) initializing an integer i as i=1, and repeating the following steps h) through j) until i>u:

h) embedding the message $(nx+ny+1)N$-bit string of an i-th block into the $(nx+1)$ x-coordinates $x_0, x_1, \ldots, x_{nx}$, and the ny y-coordinates, $y_1, \ldots, y_{ny}$, of the elliptic message point $(x_{0,m_i}, x_{1,m_i}, \ldots, x_{nx,m_i}, \sqrt{\alpha_m}y_{0,m_i}, y_{1,m_i}, \ldots, y_{ny,m_i})$ using the non-iterative embedding method;

i) doubling the points $(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$ as: $(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) = 2(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}}) = 2(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$;

j) if the message point of the i-th block is on the elliptic polynomial, then the message authentication code points are computed as $$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$$

and $$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$$

Otherwise, they are computed as:

$$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$$

and $$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}});$$

k) a set of appropriate bits of the x-coordinates $x_{0,c}, x_{1,c}, \ldots, x_{nx,c}$, y-coordinates $y_{1,c}, \ldots, y_{yn,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_u})$, and a set of appropriate bits of the x-coordinates $x_{0,Tc}, x_{1,Tc}, \& x_{nx,Tc}$ y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

l) embedding the bit string of the secret key into the $(nx+1)$ x-coordinates $x_0, x_1, \ldots, x_{nx}$, and the ny y-coordinates $y_1, \ldots, y_{ny}$, of the key elliptic point $(x_{0,k}, x_{1,k}, \ldots, x_{nx,k}, \sqrt{\alpha_k}y_{0,k}, y_{1,k}, \ldots, y_{ny,k})$ using the non-iterative embedding method;

m) if the point $(x_{0,k}, x_{1,k}, \ldots, x_{nx,k}, \sqrt{\alpha_k}y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ and $(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, \sqrt{\alpha_k}y_{0,k}, y_{1,k}, \ldots, y_{ny,k})$ otherwise if $\alpha_k = \alpha_o$ then the scalar multiplication is performed as $$(x_{0,S_0}, x_{1,S_0}, \ldots, x_{nx,S_0}, y_{0,S_0}, y_{1,S_0}, \ldots, y_{ny,S_0}) = (x_{0,k}, x_{1,k}, \ldots, x_{nx,k}, y_{0,k}, y_{1,k}, \ldots, y_{ny,k})$$

and $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k})$;

n) dividing the received message bit string into M-bit strings where $((nx+ny+1)N-L) > M > (N-L)$, where M and L are integers, and embedding the received message bit string of the initial block of the received message bit string into the $(nx+1)$ x-coordinates and the ny y-coordinates of the received message elliptic point $(x_{0,rm_0}, x_{1,rm_0}, \ldots, x_{nx,rm_0}, \sqrt{\alpha}y_{0,rm_0}, y_{1,rm_0}, \ldots, y_{ny,rm_0})$ using the non-iterative embedding method;

o) if the message point of the 0-th block is on the elliptic polynomial, then the message authentication points are computed as:

$$(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, x_{ny,S_0})$$

and $$(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\alpha}y_{0,TS_0}, y_{1,TS_0}, \ldots, x_{ny,TS_0}).$$

Otherwise, they are computed as:

$$(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,rm_0}, x_{1,rm_0}, \ldots, x_{nx,rm_0}, \sqrt{\alpha}y_{0,rm_0}, y_{1,rm_0}, \ldots, y_{ny,rm_0}) (x_{0,TS_0}, x_{1,TS_0}, \ldots, x_{nx,TS_0}, \sqrt{\alpha}y_{0,TS_0}, y_{1,TS_0}, \ldots, x_{ny,TS_0})$$

and $$(x_{0,rc_0}, x_{1,rc_0}, \ldots, x_{nx,rc_0}, y_{0,rc_0}, y_{1,rc_0}, \ldots, y_{ny,rc_0}) = (x_{0,S_0}, x_{1,S_0}, \ldots, x_{nx,S_0}, y_{0,S_0}, y_{1,S_0}, \ldots, y_{ny,S_0})$$

p) initializing the integer i as i=0, the following steps q) through s) are repeated until i>u:

q) embedding the received message $(nx+ny+1)N$-bit string of the i-th block the into the $(nx+1)$ x-coordinates $x_0, x_1, \ldots, x_{nx}$, and the ny y coordinates $y_1, \ldots, y_{ny}$ of the received message elliptic point $(x_{0,rm_i}, x_{1,rm_i}, \ldots, x_{nx,rm_i}, \sqrt{\alpha}y_{0,rm_i}, y_{1,rm_i}, \ldots, y_{ny,rm_i})$ using the non-iterative embedding method;

r) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ $$(x_{0,S_i}, x_{1,S_i}, \ldots, x_{nx,S_i}, y_{0,S_i}, y_{1,S_i}, \ldots, y_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$$

$$(x_{0,TS_i}, x_{1,TS_i}, \ldots, x_{nx,TS_i}, \sqrt{\alpha}y_{0,TS_i}, y_{1,TS_i}, \ldots, x_{ny,TS_0}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}});$$

s) if the received message point of the i-th block is on the elliptic polynomial, then the message authentication points are computed as $$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i}, x_{1,rm_i}, \ldots, x_{nx,rm_i}, y_{0,rm_i}, y_{1,rm_i}, \ldots, y_{ny,rm_i}) + (x_{0,rc_{i-1}}, x_{1,rc_{i-1}}, \ldots, x_{nx,rc_{i-1}}, y_{0,rc_{i-1}}, y_{1,rc_{i-1}}, \ldots, x_{ny,rc_{i-1}})$$

and $(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$, otherwise they are computed as:

$$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rm_i}, x_{1,rm_i}, \ldots, x_{nx,rm_i}, \sqrt{\alpha}y_{0,rm_i}, y_{1,rm_i}, \ldots, y_{ny,rm_i}) + (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, y_{ny,rTc_{i-1}})$$

and $$(x_{0,rc_i}, x_{1,rc_i}, \ldots, x_{nx,rc_i}, y_{0,rc_i}, y_{1,rc_i}, \ldots, y_{ny,rc_i}) = (x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}});$$

t) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_u})$, and the appropriate bits of the x-coordinates $x_{0,rTc}, x_{1,rTc}, \ldots, x_{nx,rTc}$, Y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, \sqrt{\overline{\alpha}}y_{0,rTc_u}, y_{1,rTc_u}, \ldots, y_{ny,rTc_u})$ are concatenated together to form the message authentication code of the received message; and u) if the received message authentication code is equal to the message authentication code of the received message generated at the receiving correspondent, the received message is authenticated.

In a further alternative embodiment, the MAC generation method includes the following steps:

a) defining a maximum block size that can be embedded into (nx+1) x-coordinates and ny y-coordinates, wherein n is an integer and nx and ny are integers, and setting the maximum block size to be (nx+ny+1)N bits, wherein N is an integer, and defining the number of (nx+ny+1)N-bit blocks in a message bit string to be (u+1), wherein u is an integer, and further representing the (nx+ny+1)N bit string of the i-th message block, wherein i is an integer, as $S_{m_i}$;

b) a sending correspondent and a receiving correspondent agree upon the values of nx and ny and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field and where the elements of F are represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\overline{\alpha}}y_{0,B}, y_{1,TB}, \ldots, y_{ny,TB}) \in T\ EC^{nx+ny+2}$, wherein $TEC^{nx+ny+2}$ represents the twist of the elliptic polynomial $EC^{nx+ny+2}$, and wherein $\overline{\alpha}$ is a non-quadratic residue element of F, the sending and receiving correspondents further agreeing on an initial vector $S_{m_{-1}}$, having a length of (nx+ny+1)N-bits;

the sending correspondent then performs the following steps:

c) embedding the bit string of the secret key into the (nx+1) x-coordinates $x_0, x_1, \ldots, x_{nx}$, and the ny y-coordinates $y_1, \ldots, y_{ny}$ of a key elliptic point $(x_{0,k}, x_{1,k}, \ldots, x_{nx,k}, \sqrt{\alpha_k}y_{0,k}, y_{1,k}, \ldots, y_{ny,k})$ using a non-iterative embedding method to be described below;

d) if $(x_{0,k}, x_{1,k}, \ldots, x_{nx,k}, \sqrt{\alpha_k}y_{0,k}, y_{1,k}, \ldots, y_{ny,k})$ is on the elliptic polynomial, a scalar multiplication is computed as $$(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = k(x_{0,TB}, x_{1,TB}, \ldots, x_{nx,TB}, \sqrt{\overline{\alpha}}y_{0,B}, y_{1,TB}, \ldots, y_{ny,TB})$$

and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, otherwise if $\alpha_k = \overline{\alpha}$, then the scalar multiplication is computed as $$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$$ and $$(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k});$$

e) denoting the first (nx+ny+1)N-bit string of the message data to be $s_{m_0}'$ and computing the (nx+ny+1)N-bit string $s_{m_0}$ as $s_{m_0} = s_{m_0}' \oplus s_{m_{-1}}$;

f) dividing the message bit string into M-bit strings, where $((nx+ny+1)N-L) > M > (N-L)$, wherein M and L are integers, and embedding the message bit string of the initial block of the message bit string $s_{m_0}$ into the (nx+1) x-coordinates and ny y-coordinates of the elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$ using the non-iterative embedding method;

g) if the message point of the 0-th block is on the elliptic polynomial, then the message authentication code points are computed as:

$$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, x_{ny,S_0})$$ and $$(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$$

Otherwise, they are computed as:

$$(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = (x_{0,m_0}, x_{1,m_0}, \ldots, x_{nx,m_0}, \sqrt{\overline{\alpha}}y_{0,m_0}, y_{1,m_0}, \ldots, y_{ny,m_0}) + (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$$ and $$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0});$$

h) initializing i as I=1, and repeating the following steps i) through l) until i>u:

i) denoting the (nx+ny+1)N-bit string of an $i_{th}$ message data to be $S_{m_i}$ and computing the (nx+ny+1)N-bit string $s_{m_i}$ as $s_{m_i} = s_{m_i}' \oplus s_{m_{i-1}}$;

j) embedding the message (nx+ny+1)N-bit string of an i-th block $S_{m_i}'$ into the (nx+1) x-coordinates $x_0, x_1, \ldots, x_{nx}$ and the ny y-coordinates, $y_1, \ldots, y_{ny}$, of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using the non-iterative embedding method;

k) doubling the points $(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$ as:

$$(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) = 2(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$$ and $$(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}}) = 2(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}});$$

l) if the message point of the i-th block is on the elliptic polynomial, then the message authentication code points are computed as:

$$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$$ and $$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}}).$$

Otherwise, they are computed as:

$$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,m_i}, x_{1,m_i}, \ldots, x_{nx,m_i}, \sqrt{\overline{\alpha}}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$$ and $$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}});$$

m) a set of appropriate bits of the x-coordinates $x_{0,Tc}, x_{1,Tc}, \ldots, x_{nx,Tc}$, y-coordinates $y_{1,c}, \ldots, y_{ny,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_u})$, and a set of appropriate bits of the x-coordinates $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

n) embedding the bit string of the secret key into the $(nx+1)$ x-coordinates $x_0, x_1, \ldots, x_{nx}$, and the ny y-coordinates $y_1, \ldots, y_{ny}$ of the key elliptic point $(x_{0,k}, x_{1,k}, \ldots, x_{nx,k}, \sqrt{\alpha_k}y_{0,k}, y_{1,k}, \ldots, y_{ny,k})$ using the non-iterative embedding method;

o) if the point $(x_{0,k}, x_{1,k}, \ldots, x_{nx,k}, \sqrt{\alpha_k}y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$ and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, otherwise if $\alpha_k = \alpha_o$ then the scalar multiplication is performed as $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$ $(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, y_{0,k}, y_{1,k}, \ldots, y_{ny,k})$;

p) denoting the first $(nx+ny+1)N$-bit string of the message data to be $s_{rm_0}'$ and computing the $(nx+ny+1)N$-bit string $s_{rm_0}$) as $s_{rm_0} = s_{rm_0}' \oplus s_{rm_{-1}}$;

q) dividing the message bit string into M-bit strings where $((nx+ny+1)N-L) > M > (N-L)$, wherein M and L are integers, and embedding the message bit string of the initial block of the message bit string $s_{rm_0}$ into the $(nx+1)$ x-coordinates and the ny y-coordinates of the received message elliptic point $(x_{0,rm_0}, x_{1,rm_0}, \ldots, x_{nx,rm_0}, \sqrt{\alpha_{rm_0}}y_{0,rm_0}, y_{1,rm_0}, \ldots, y_{ny,rm_0})$ using the non-iterative embedding method;

r) if the message point of the 0-th block is on the elliptic polynomial, then the message authentication points are computed as:

$$(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, x_{ny,S_0}) \text{ and}$$

$$(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\alpha}y_{0,TS_0}, y_{1,TS_0}, \ldots, y_{ny,TS_0}).$$

Otherwise they are computed as:

$$(x_{0,rTc_0}, x_{1,rTc_0}, \ldots, x_{nx,rTc_0}, \sqrt{\alpha}y_{0,rTc_0}, y_{1,rTc_0}, \ldots, y_{ny,rTc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,TS_0}, x_{1,TS_0}, \ldots, x_{nx,TS_0}, \sqrt{\alpha}y_{0,TS_0}, y_{1,TS_0}, \ldots, x_{ny,TS_0}) \text{ and}$$

$$(x_{0,rc_0}, x_{1,rc_0}, \ldots, x_{nx,rc_0}, y_{0,rc_0}, y_{1,rc_0}, \ldots, y_{ny,rc_0}) = (x_{0,S_0}, x_{1,S_0}, \ldots, x_{nx,S_0}, y_{0,S_0}, y_{1,S_0}, \ldots, x_{ny,S_0})$$

s) initializing the integer i as i=0, the following steps t) through w) are repeated until i>u:

t) denoting the $(nx+ny+1)N$-bit string of an $i_{th}$ message data to be $s_{rm_i}'$ and computing the $(nx+ny+1)N$-bit string $s_{rm_i}$ as $s_{rm_i} = s_{rm_i}' \oplus s_{rm_{i-1}}$;

u) embedding the received message $(nx+ny+1)N$-bit string of the i-th block $s_{rm_i}$ the into the $(nx+1)$ x-coordinates $x_0, x_1, \ldots, x_{nx}$, and the ny y-coordinates $y_1, \ldots, y_{ny}$, of the received message elliptic point $(x_{0,rm_i}, x_{1,rm_i}, \ldots, x_{nx,rm_i}, \sqrt{\alpha_{rm_i}}y_{0,rm_i}, y_{1,rm_i}, \ldots, y_{ny,rm_i})$ using the non-iterative embedding method;

v) doubling the points $(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}})$ and $(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}})$ as:

$$(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}}) = 2(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}})$$

$$(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}}) = 2(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}});$$

w) if the received message point of the i-th block is on the elliptic polynomial, then the message authentication points are computed as $$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i}, x_{1,rm_i}, \ldots, x_{nx,rm_i}, y_{0,rm_i}, y_{1,rm_i}, \ldots, y_{ny,rm_i}) + (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}})$$

and $(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$. Otherwise they are computed as:

$$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rm_i}, x_{1,rm_i}, \ldots, x_{nx,rm_i}, \sqrt{\alpha}y_{0,rm_i}, y_{1,rm_i}, \ldots, y_{ny,rm_i}) + (x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, x_{ny,rTc_{i-1}}) \text{ and}$$

$$(x_{0,rc_i}, x_{1,rc_i}, \ldots, x_{nx,rc_i}, y_{0,rc_i}, y_{1,rc_i}, \ldots, y_{ny,rc_i}) = (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}});$$

x) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_u})$, and the appropriate bits of the x-coordinates $x_{0,rTc}, x_{1,rTc}, \ldots, x_{nx,rTc}$, y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, \sqrt{\alpha}y_{0,rTc_u}, y_{1,rTc_u}, \ldots, y_{ny,rTc_u})$ are concatenated together to form the message authentication code of the received message; and y) if the received message authentication code is equal to the message authentication code of the received message generated at the receiving correspondent, the received message is authenticated.

The above methods can also be applied to find the MAC for bit streams of media data such as text, audio, video, or a multimedia data. Further, the MAC methods given above can be applied to the verification of media data. For efficiency of computation, the above methods are used with a pre-processing stage, which is used to compress the media data prior to the application of the MAC method. Either a lossless compression method or a lossy compression method can be used to compress the media data in the pre-processing stage. The bit string of the compressed message at the output of the pre-processing stage is then used as the input to the MAC generation methods.

With regard to data embedding, in the following, it is assumed that the maximum block size that can be embedded into the $(nx+1)$ x-coordinates and the ny y-coordinates is $(nx+ny+1)N$ bits, and that the compressed media data bit string length is a multiple of $(nx+ny+1)N$, such as $(u+1)(nx+ny+1)N$. In other words, the number of $(nx+ny+1)N$-bit blocks in a message bit string is $(u+1)$. The data embedding is then performed as follows:

a) dividing the message bit string into M-bit strings where $((nx+ny+1)N-L) > M > (N-L)$, wherein M and L are integers;

b) dividing each M-bit string into $(nx+ny+1)$ strings $mx_0, mx_1, \ldots, mx_{nx}, my_1, \ldots, my_{ny}$, wherein the length of string $mx_0$ is less than or equal to $(N-L)$ bits, the length of each of the remaining $(nx+ny)$ strings $mx_1, \ldots, mx_{nx}, my_1, \ldots, my_{ny}$ being less than or equal to N bits, wherein each of the $(nx+ny+1)$ bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1, \ldots, y_{ny}$;

e) assigning the value of the bit string of $mx_0$ to $x_0$;

f) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + Ay_0 + B = 0$, wherein A and B are variable coefficients;

g) if the quadratic equation in $y_o$ has solutions $\bar{y}_{0,1}, \bar{y}_{0,2}$, wherein the solutions are elements of the finite field F, then a method agreed upon by the sending and receiving correspondent is used to select one of the solutions $\bar{y}_{0,1}, \bar{y}_{0,2}$, and further assigning the chosen solution to $y_o$, assigning $\alpha_m = 1$, and the message point is given by $(x_{0,m}, x_{1,m}, \ldots, x_{nx,m}, y_{0,m}, y_{1,m}, \ldots, y_{ny,m})$, otherwise a method agreed upon by the sending and receiving correspondent is used to select one of the solutions $\sqrt{\bar{\alpha}y}_{0,1}, \sqrt{\bar{\alpha}y}_{0,2}$, and then further assign the chosen solution to $y_o$ assigning $\alpha_m = \bar{\alpha}$ and the message point is given by $(x_{0,m}, x_{1,m}, \ldots, x_{nx,m}, \sqrt{\bar{\alpha}}y_{0,m}, y_{1,m}, \ldots, y_{ny,m})$ h) denoting the message point as: $(x_{0,m}, x_{1,m}, \ldots, x_{nx,m}, \sqrt{\bar{\alpha}}y_{0,m}, y_{1,m}, \ldots, y_{ny,m})$, where the point is on the elliptic polynomial if $\alpha_{m_i} = 1$, and the point is on the twist if $\alpha_{m_i} = \bar{\alpha}$.

It should be noted that in the case of quadratic equations with A=0, the Legendre symbol can be used as an efficient test for the existence of a solution of the quadratic equation above. The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise} \end{cases}.$$

In the above, the MACs use the scalar multiplication $k_m(x_{Pu}, y_{Pu})$. It should be noted that, in order to find a collision means, that there are two message bits strings m and m' such that their integer values $k_m$ and $k_{m'}$ will lead to $k_m k(x_B, y_B) = k_{m'} k(x_B, y_B)$. This collision implies that integers can be found such that $k_m k - k_{m'} k = l \ast \#EC$, where #EC is the order of the group (EC,+). This is equivalent to solving the elliptic polynomial discrete logarithm problem. This also applies to finding a collision for the points on the twist of an elliptic polynomial, $k_m k(x_{TB}, \sqrt{\bar{\alpha}}y_{TB}) = k_{m'} k(x_{TB}, \sqrt{\bar{\alpha}}y_{TB})$.

Thus, security of the MACs depends on the security of the underlying elliptic polynomial cryptography. The security of elliptic polynomial cryptosystems is assessed by both the effect on the solution of the elliptic polynomial discrete logarithmic problem (ECDLP) and power analysis attacks.

It is well known that the elliptic polynomial discrete logarithm problem (ECDLP) is apparently intractable for non-singular elliptic polynomials. The ECDLP problem can be stated as follows: given an elliptic polynomial defined over F that needs N-bits for the representation of its elements, an elliptic polynomial point $(x_P, y_P) \in EC$, defined in affine coordinates, and a point $(x_Q, y_Q) \in EC$, defined in affine coordinates, determine the integer k, $0 \leq k \leq \#F$, such that $(x_Q, y_Q) = k(x_P, y_P)$, provided that such an integer exists. In the below, it is assumed that such an integer exists.

The most well known attack used against the ECDLP is the Pollard $\rho$-method, which has a complexity of $O(\sqrt{\pi K}/2)$, where K is the order of the underlying group, and the complexity is measured in terms of an elliptic polynomial point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinate can also be used by the sending correspondent and the receiving correspondent to embed extra message data bits in the projective coordinate wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic polynomial equation with (nx+1) x-coordinates and (nx+1) y coordinates in projective coordinates and substituting a straight line equation to obtain a cubic equation in terms of one of the x-coordinates. This cubic equation can be used to identify the third point of intersection between a straight line and the elliptic polynomial in (nx+ny+3) dimensions given two other intersection points. This third point of intersection is used to identify the sum of the given two points.

It will be understood that the MACs based on elliptic polynomial cryptography described above may be implemented by software stored on a medium readable by a computer and executing as set of instructions on a processor (including a microprocessor, microcontroller, or the like) when loaded into main memory in order to carry out a cryptographic system of secure communications in a computer network. As used herein, a medium readable by a computer includes any form of magnetic, optical, mechanical, laser, or other media readable by a computer, including floppy disks, hard disks, compact disks (CDs), digital versatile disk (DVD), laser disk, magnetic tape, paper tape, punch cards, flash memory, etc.

It is to be understood that the present invention is not limited to the embodiments described above, but encompasses any and all embodiments within the scope of the following claims.

We claim:

1. A computerized method of generating an elliptic polynomial-based message authentication code, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a_{1k}, a_{2kl}, a_{3k}, c_{1lki}, c_{2kl}, c_{3kli}, b_{1l}, b_{2lk},$ $b_{3lk}$, $b_{4k}$ & $b_c \in F$, wherein F represents a finite field where the field's elements can be represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\overline{\alpha}}y_{0,B}, y_{1,TB}, \ldots, y_{ny,TB}) \in EC^{nx+ny+2}$, wherein $TEC^{nx+ny+2}$ represents the twist of the elliptic polynomial $EC^{nx+ny+2}$, and further, $\overline{\alpha}$ is a non-quadratic residue element of F;

the sending correspondent then performs the following steps:

c) embedding the bit string of the secret key into the (nx+1) x-coordinates $x_0, x_1, \ldots, x_{nx}$, and the ny y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$ using a non-iterative embedding method;

d) if $(x_{0,k}, x_{1,k}, \ldots, x_{nx,k}, \sqrt{\alpha_k}y_{0,k}, y_{1,k}, \ldots, y_{ny,k})$ is on the elliptic polynomial, a scalar multiplication is computed as:

$$(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = k(x_{0,TB}, x_1, \ldots, x_{nx,TB}, \sqrt{\overline{\alpha}}y_{0,TB}, y_{1,TB}, \ldots, y_{ny,TB}) \text{ and}$$

$$(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k}),$$

otherwise, if $\alpha_k = \overline{\alpha}$, then the scalar multiplication is computed as:

$$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B}) \text{ and}$$

$$(x_{0,TS_0}, x_{1,TS_0}, \ldots, x_{nx,TS_0}, \sqrt{\overline{\alpha}}y_{0,TS_0}, y_{1,TS_0}, \ldots, y_{ny,TS_0}) = (x_{0,k}, x_{1,k}, \ldots, x_{nx,k}, \sqrt{\alpha_k}y_{0,k}, y_{1,k}, \ldots, y_{ny,k});$$

e) dividing the message bit string into M-bit strings where $((nx+ny+1)N-L) > M > (N-L)$, where M and L are integers, and embedding the message bit string of the initial block of the message bit string into the (nx+1) x-coordinates and the ny y-coordinates of the elliptic message point $(x_{0,m_0}, x_{1,m_0}, \ldots, x_{nx,m_0}, \sqrt{\alpha_{m_0}}y_{0,m_0}, y_{1,m_0}, \ldots, y_{ny,m_0})$ using the non-iterative embedding method;

f) if the message point of the 0-th block is on the elliptic polynomial, then the message authentication code points are computed as $$(x_{0,c_0}, x_{1,c_0}, \ldots, x_{nx,c_0}, \sqrt{\overline{\alpha}}y_{0,c_0}, y_{1,c_0}, \ldots, y_{ny,c_0}) = (x_{0,m_0}, x_{1,m_0}, \ldots, x_{nx,m_0}, \sqrt{\overline{\alpha}}y_{0,m_0}, y_{1,m_0}, \ldots, y_{ny,m_0}) + (x_{0,S_0}, x_{1,S_0}, \ldots, x_{nx,S_0}, \sqrt{\overline{\alpha}}y_{0,S_0}, y_{1,S_0}, \ldots, x_{ny,S_0})$$

and $(x_{0,Tc_0}, x_{1,Tc_0}, \ldots, x_{nx,Tc_0}, \sqrt{\overline{\alpha}}y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$, otherwise, they are computed as:

$$(x_{0,Tc_0}, x_{1,Tc_0}, \ldots, x_{nx,Tc_0}, y_{0,Tc_0}, y_{1,Tc_0}, \ldots, y_{ny,Tc_0}) = (x_{0,m_0}, x_{1,m_0}, \ldots, x_{nx,m_0}, y_{0,m_0}, y_{1,m_0}, \ldots, y_{ny,m_0}) + (x_{0,TS_0}, x_{1,TS_0}, \ldots, x_{nx,TS_0}, y_{0,TS_0}, y_{1,TS_0}, \ldots, x_{ny,TS_0}) \text{ and}$$

$$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0});$$

g) initializing an integer i as i=1, and repeating the following steps h) and i) and incrementing i at each step until all of the message data blocks are processed:

h) embedding the message (nx+ny+1)N-bit string of an i-th block into the (nx+1) x-coordinates $x_0, x_1, \ldots, x_{nx}$ and the ny y-coordinates, $y_1, \ldots, y_{ny}$, of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using the non-iterative embedding method;

i) if the message point of the i-th block is on the elliptic polynomial, then the message authentication code points are computed as $$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}}) \text{ and}$$

$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}})$, otherwise, they are computed as:

$$(x_{0,Tc_i}, x_{1,Tc_i}, \ldots, x_{nx,Tc_i}, \sqrt{\overline{\alpha}}y_{0,Tc_i}, y_{1,Tc_i}, \ldots, y_{ny,Tc_i}) = (x_{0,m_i}, x_{1,m_i}, \ldots, x_{nx,m_i}, \sqrt{\overline{\alpha}}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\overline{\alpha}}y_{0,Tc_{i-1}}, y_{1,Tc_{i-1}}, \ldots, x_{ny,Tc_{i-1}}) \text{ and}$$

$$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}});$$

j) a set of appropriate bits of the x-coordinates $x_{0,c}, x_{1,c}, \ldots, x_{nx,c}$, y-coordinates $y_{1,c}, \ldots, y_{ny,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_u})$ and a set of appropriate bits of the x-coordinates $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, \sqrt{\overline{\alpha}}y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

k) embedding the bit string of the secret key into the (nx+1) x-coordinates $x_0, x_1, \ldots, x_{nx}$, and the ny y-coordinates $y_1, \ldots, y_{ny}$, of the key elliptic point $(x_{0,k}, x_{1,k}, \ldots, x_{nx,k}, \sqrt{\alpha_k}y_{0,k}, y_{1,k}, \ldots, y_{ny,k})$ using the non-iterative embedding method;

l) if the point $(x_{0,k}, x_{1,k}, \ldots, x_{nx,k}, \sqrt{\alpha_k}y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = k(x_{0,TB}, x_{1,TB}, \ldots, x_{nx,TB}, \sqrt{\overline{\alpha}}y_{0,TB}, y_{1,TB}, \ldots, y_{ny,TB})$ and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$ otherwise if $\alpha_k = \alpha_o$ then the scalar multiplication is performed as $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$ and $(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = (x_{0,k}, x_{1,k}, \ldots, x_{nx,k}, \sqrt{\alpha_k}y_{0,k}, y_{1,k}, \ldots, y_{ny,k})$;

m) dividing the received message bit string into M-bit strings where $((nx+ny+1)N-L) > M > (N-L)$, where M and L are integers, and embedding the received message (nx+ny+1)N-bit string of the initial block of the received message bit string into the (nx+1) x-coordinates and the ny y-coordinates of the received message elliptic point $(x_{0,rm_0}, x_{1,rm_0}, \ldots, x_{nx,rm_0}, \sqrt{\alpha_{rm_0}}y_{0,rm_0}, y_{1,rm_0}, \ldots, y_{ny,rm_0})$ using the non-iterative embedding method;

n) if the message point of the initial block is on the elliptic polynomial, then the message authentication points are computed as:

$$(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, x_{ny,S_0}) \text{ and}$$

$(x_{0,rTc_0}, x_{1,rTc_0}, \ldots, x_{nx,rTc_0}, \sqrt{\overline{\alpha}}y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0})$,
otherwise, they are computed as:

$$(x_{0,rTc_0}, x_{1,rTc_0}, \ldots, x_{nx,rTc_0}, \sqrt{\overline{\alpha}}y_{0,rTc_0}, y_{1,rTc_0}, \ldots,$$
$$y_{ny,rTc_0}) = (x_{0,rm_0}, x_{1,rm_0}, \ldots, x_{nx,rm_0},$$
$$\sqrt{\overline{\alpha}}y_{0,rm_0}, y_{1,rm_0}, \ldots, y_{ny,rm_0}) + (x_{0,TS_0}, x_{1,TS_0}, \ldots,$$
$$x_{nx,TS_0}, \sqrt{\overline{\alpha}}y_{0,TS_0}, y_{1,TS_0}, \ldots, x_{ny,TS_0}) \text{ and}$$

$$(x_{0,rc_0}, x_{1,rc_0}, \ldots, x_{nx,rc_0}, y_{0,rc_0}, y_{1,rc_0}, \ldots, y_{ny,rc_0}) = (x_{0,S_0}, x_{1,S_0}, \ldots, x_{nx,S_0}, y_{0,S_0}, y_{1,S_0}, \ldots, x_{ny,S_0});$$

o) initializing the integer i as i=0, and repeating the following steps p) and q) and incrementing i at each step until all of the message data blocks are processed:

p) embedding the received message (nx+ny+1)N-bit string of the i-th block the into the (nx+1) x-coordinates $x_0$, $x_1, \ldots, x_{nx}$, and the ny y-coordinates $y_1, \ldots, y_{ny}$) of the received message elliptic point $(x_{0,rm_i}, x_{1,rm_i}, \ldots, x_{nx,rm_i}, \sqrt{\overline{\alpha}_{rm_i}}y_{0,rm_i}, y_{1,rm_i}, \ldots, y_{ny,rm_i})$ using the non-iterative embedding method;

q) if the received message point of the i-th block is on the elliptic polynomial, then the message authentication points are computed as:

$$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i},$$
$$x_{1,rm_i}, \ldots, x_{nx,rm_i}, y_{0,rm_i}, y_{1,rm_i}, \ldots, y_{ny,rm_i}) +$$
$$(x_{0,rc_{i-1}}, x_{1,rc_{i-1}}, \ldots, x_{nx,rc_{i-1}}, y_{0,rc_{i-1}}, y_{1,rc_{i-1}}, \ldots,$$
$$x_{ny,rc_{i-1}})$$

and
$(x_{0,rTc_i}, x_{1,rTc_i}, \ldots, x_{nx,rTc_i}, \sqrt{\overline{\alpha}}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\overline{\alpha}}y_{0,rTc_{i-1}}, y_{1,rTc_{i-1}}, \ldots, x_{ny,rTc_{i-1}})$, otherwise, they are computed as:

$$(x_{0,rTc_i}, x_{1,rTc_i}, \ldots, x_{nx,rTc_i}, \sqrt{\overline{\alpha}}y_{0,rTc_i}, y_{1,rTc_i}, \ldots,$$
$$y_{ny,rTc_i}) = (x_{0,rm_i}, x_{1,rm_i}, \ldots, x_{nx,rm_i}, \sqrt{\overline{\alpha}}y_{0,rm_i},$$
$$y_{1,rm_i}, \ldots, y_{ny,rm_i}) + (x_{0,rTc_{i-1}}, x_{1,rTc_{i-1}}, \ldots,$$
$$x_{nx,rTc_{i-1}}, \sqrt{\overline{\alpha}}y_{0,rTc_{i-1}}, y_{1,rTc_{i-1}}, \ldots, y_{ny,rTc_{i-1}});$$

r) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_u})$, and the appropriate bits of the x-coordinates $x_{0,rTc}, x_{1,rTc}, \ldots, x_{nx,rTc}$, y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, y_{0,rTc_u}, y_{1,rTc_u}, \ldots, y_{ny,rTc_u})$ are concatenated together to form the message authentication code of the received message; and s) if the received message authentication code is equal to the message authentication code of the received message generated at the receiving correspondent, the received message is authenticated.

2. The computerized method of generating an elliptic polynomial-based message authentication code as recited in claim 1, wherein the non-iterative embedding method comprises the steps of:

a) dividing the message bit string into M-bit strings where $((nx+ny+1)N-L)>M>(N-L)$, wherein M and L are integers;

b) dividing each M-bit string into (nx+ny+1) strings $mx_0$, $mx_1, \ldots, mx_{nx}, my_1, \ldots, my_{ny}$, wherein the length of string $mx_0$ is less than or equal to (N-L) bits, the length of each of the remaining (nx+ny) strings $mx_1, \ldots, mx_{nx}$, $my_1, \ldots, my_{ny}$ being less than or equal to N bits, wherein each of the (nx+ny+1) bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1, \ldots, y_{ny}$;

e) assigning the value of the bit string of $mx_0$ to $x_0$;

f) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$ of the form $y_0^2 + Ay_0 + B = 0$, wherein A and B are variable coefficients;

g) if the quadratic equation in $y_o$ has solutions $\overline{y}_{0,1}, \overline{y}_{0,2}$, wherein the solutions are elements of the finite field F, then a method agreed upon by the sending and receiving correspondent is used to select one of the solutions $\overline{y}_{0,1}, \overline{y}_{0,2}$, and further assigning the chosen solution to $y_o$, assigning $\alpha_m = 1$, and the message point is given by $(x_{0,m}, x_{1,m}, \ldots, x_{nx,m}, y_{0,m}, y_{1,m}, \ldots, y_{ny,m})$, otherwise a method agreed upon by the sending and receiving correspondent is used to select one of the solutions $\sqrt{\overline{\alpha}}\overline{y}_{0,1}, \sqrt{\overline{\alpha}}\overline{y}_{0,2}$, and then further assign the chosen solution to $y_o$, assigning $\alpha_m = \overline{\alpha}$ and the message point is given by $(x_{0,m}, x_{1,m}, \ldots, x_{nx,m}, \sqrt{\overline{\alpha}}y_{0,m}, y_{1,m}, \ldots, y_{ny,m})$; and h) denoting the message point as $(x_{0,m}, x_{1,m}, \ldots, x_{nx,m}, \sqrt{\overline{\alpha}}y_{0,m}, y_{1,m}, \ldots, y_{ny,m})$.

3. A computerized method of generating an elliptic polynomial-based message authentication code, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, where nx and ny are integers, and further agree on a set of coefficients $a_{1k}$, $a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field and where the elements of F are represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\overline{\alpha}}y_{0,B}, y_{1,TB}, \ldots, y_{ny,TB}) \in TEC^{nx+ny+2}$, wherein $TEC^{nx+ny+2}$ represents the twist of the elliptic polynomial $EC^{nx+ny+2}$, and where $\overline{\alpha}$ is a non-quadratic residue element of F;

the sending correspondent then performs the following steps:

c) embedding the bit string of the secret key into the (nx+1) x-coordinates $x_0, x_1, \ldots, x_{nx}$, and the ny y-coordinates $y_1, \ldots, y_{ny}$) of a key elliptic point $(x_{0,k}, x_{1,k}, \ldots, x_{nx,k}, \sqrt{\overline{\alpha}_k}y_{0,k}, y_{1,k}, \ldots, y_{ny,k})$ using a non-iterative embedding method;

d) if $(x_{0,k}, x_{1,k}, \ldots, x_{nx,k}, \sqrt{\overline{\alpha}_k}y_{0,k}, y_{1,k}, \ldots, y_{ny,k})$ is on the elliptic polynomial, a scalar multiplication is computed as:

$$(x_{0,TS_0}, x_{1,TS_0}, \ldots, x_{nx,TS_0}, \sqrt{\overline{\alpha}}y_{0,TS_0}, y_{1,TS_0}, \ldots, x_{ny,TS_0}) = k(x_{0,TB_0}, x_{1,TB_0}, \ldots, x_{nx,TB_0}, \sqrt{\overline{\alpha}}y_{0,B_0},$$
$$y_{1,TB_0}, \ldots, y_{ny,TB_0})$$

and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, otherwise, if $\alpha_k = \alpha$, then the scalar multiplication is computed as:

$$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B}) \text{ and}$$

$$(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, y_{0,k}, y_{1,k}, \ldots, y_{ny,k});$$

e) dividing the message bit string into M-bit strings where $((nx+ny+1)N-L) > M > (N-L)$, where M and L are integers, and embedding the message bit string of the initial block of the message bit string into the $(nx+1)$ x-coordinates and the ny y-coordinates of the elliptic message point $(x_{0,m_0}, x_{1,m_0}, \ldots, x_{nx,m_0}, \sqrt{\alpha_{m_0}} y_{0,m_0}, y_{1,m_0}, \ldots, y_{ny,m_0})$ using the non-iterative embedding method;

f) if the message point of the 0-th block is on the elliptic polynomial, then the message authentication code points are computed as:

$$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, y_{ny,S_0}) \text{ and}$$

$$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha} y_{0,TS_0}, y_{1,TS_0}, \ldots, y_{ny,TS_0}),$$ otherwise, they are computed as:

$$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha} y_{0,m_0}, y_{1,m_0}, \ldots, y_{ny,m_0}) + (x_{0,TS_0}, x_{1,TS_0}, \ldots, x_{nx,TS_0}, \sqrt{\alpha} y_{0,TS_0}, y_{1,TS_0}, \ldots, y_{ny,TS_0}) \text{ and}$$

$$(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0});$$

g) initializing an integer i as $i=1$, and repeating the following steps h) through j) and incrementing i at each step until all of the message data blocks are processed:

h) embedding the message $(nx+ny+1)N$-bit string of an i-th block into the $(nx+1)$ x-coordinates $x_0, x_1, \ldots, x_{nx}$ and the ny y-coordinates, $y_1, \ldots, y_{ny}$, of the elliptic message point $(x_{0,m_i}, x_{1,m_i}, \ldots, x_{nx,m_i}, \sqrt{\alpha_{m_i}} y_{0,m_i}, y_{1,m_i}, \ldots, y_{ny,m_i})$ using the non-iterative embedding method;

i) doubling the points $(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$ as:

$$(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) = 2(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) \text{ and}$$

$$(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}}) = 2(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}});$$

j) if the message point of the i-th block is on the elliptic polynomial, then the message authentication code points are computed as:

$$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) \text{ and}$$

$$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, y_{ny,Tc_{i-1}}),$$ otherwise, they are computed as:

$$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha} y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, y_{ny,Tc_{i-1}}) \text{ and}$$

$$(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}});$$

k) a set of appropriate bits of the x-coordinates $x_{0,c}, x_{1,c}, \ldots, x_{nx,c}$, y-coordinates $y_{1,c}, \ldots, y_{ny,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_u})$ and a set of appropriate bits of the x-coordinates $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, \sqrt{\alpha} y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

l) embedding the bit string of the secret key into the $(nx+1)$ x-coordinates $x_0, x_1, \ldots, x_{nx}$, and the ny y-coordinates $y_1, \ldots, y_{ny}$, of the key elliptic point $(x_{0,k}, x_{1,k}, \ldots, x_{nx,k}, \sqrt{\alpha_k} y_{0,k}, y_{1,k}, \ldots, y_{ny,k})$ using the non-iterative embedding method;

m) if the point $(x_{0,k}, x_{1,k}, \ldots, x_{nx,k}, \sqrt{\alpha_k} y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = k(x_{0,TB_0}, x_{1,TB_0}, \ldots, x_{nx,TB_0}, \sqrt{\alpha} y_{0,B_0}, y_{1,TB_0}, \ldots, y_{ny,TB_0})$ and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$ otherwise if $\alpha_k = \alpha$ then the scalar multiplication is performed as $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$ and $(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k});$ n) dividing the received message bit string into M-bit strings where $((nx+ny+1)N-L) > M > (N-L)$, where M and L are integers, and embedding the received message bit string of the initial block of the received message bit string into the $(nx+1)$ x-coordinates and the ny y-coordinates of the go received message elliptic point $(x_{0,rm_0}, x_{1,rm_0}, \ldots, x_{nx,rm_0}, \sqrt{\alpha_{rm_0}} y_{0,rm_0}, y_{1,rm_0}, \ldots, y_{ny,rm_0})$ using the non-iterative embedding method;

o) if the message point of the initial-block is on the elliptic polynomial, then the message authentication points are computed as:

$$(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, x_{ny,S_0}) \text{ and}$$

$$(x_{0,rTc_0}, x_{1,rTc_0}, \ldots, x_{nx,rTc_0}, \sqrt{\alpha} y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\alpha} y_{0,TS_0}, y_{1,TS_0}, \ldots, x_{ny,TS_0}),$$ otherwise they are computed as:

$$(x_{0,rTc_0}, x_{1,rTc_0}, \ldots, x_{nx,rTc_0}, \sqrt{\alpha} y_{0,rTc_0}, y_{1,rTc_0}, \ldots, y_{ny,rTc_0}) = (x_{0,rm_0}, x_{1,rm_0}, \ldots, x_{nx,rm_0}, \sqrt{\alpha} y_{0,rm_0}, y_{1,rm_0}, \ldots, y_{ny,rm_0}) + (x_{0,TS_0}, x_{1,TS_0}, \ldots, x_{nx,TS_0}, \sqrt{\alpha} y_{0,TS_0}, y_{1,TS_0}, \ldots, x_{ny,TS_0}) \text{ and}$$

$$(x_{0,rc_0}, x_{1,rc_0}, \ldots, x_{nx,rc_0}, y_{0,rc_0}, y_{1,rc_0}, \ldots, y_{ny,rc_0}) = (x_{0,S_0}, x_{1,S_0}, \ldots, x_{nx,S_0}, y_{0,S_0}, y_{1,S_0}, \ldots, x_{ny,S_0});$$

p) initializing the integer i as $i=0$, and repeating the following steps q) through s) and incrementing i at each step until all of the message data blocks are processed:

q) embedding the received message $(nx+ny+1)N$-bit string of the i-th block the into the $(nx+1)$ x-coordinates $x_0, x_1, \ldots, x_{nx}$, and the ny y-coordinates $y_1, \ldots, y_{ny}$, of the received message elliptic point $(x_{0,rm_i}, x_{1,rm_i}, \ldots, x_{nx,rm_i}, \sqrt{\alpha_{rm_i}} y_{0,rm_i}, y_{1,rm_i}, \ldots, y_{ny,rm_i})$ using the non-iterative embedding method;

r) doubling the points $(x_{0,S_i}, x_{1,S_i}, \ldots, x_{nx,S_i}, y_{0,S_i}, y_{1,S_i}, \ldots, y_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$ as:

$$(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$$

$$(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$$

s) if the received message point of the i-th block is on the elliptic polynomial, then the message authentication points are computed as $$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i}, x_{1,rm_i}, \ldots, x_{nx,rm_i}, y_{0,rm_i}, y_{1,rm_i}, \ldots, y_{ny,rm_i}) + (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}})$$ and $$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$$, otherwise they are computed as:

$$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rm_i}, x_{1,rm_i}, \ldots, x_{nx,rm_i}, \sqrt{\alpha}y_{0,rm_i}, y_{1,rm_i}, \ldots, y_{ny,rm_i}) + (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$$ and $$(x_{0,rc_i}, x_{1,rc_i}, \ldots, x_{nx,rc_i}, y_{0,rc_i}, y_{1,rc_i}, \ldots, y_{ny,rc_i}) = (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}});$$

t) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_u})$ and the appropriate bits of the x-coordinates $x_{0,rTc}, x_{1,rTc}, \ldots, x_{nx,rTc}$, y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, \sqrt{\alpha}y_{0,rTc_u}, y_{1,rTc_u}, \ldots, y_{ny,rTc_u})$ are concatenated together to form the message authentication code of the received message; and u) if the received message authentication code is equal to the message authentication code of the received message generated at the receiving correspondent, the received message is authenticated.

4. The computerized method of generating an elliptic polynomial-based message authentication code as recited in claim 3, wherein the non-iterative embedding method comprises the steps of:

a) dividing the message bit string into M-bit strings where $((nx+ny+1)N-L)>M>(N-L)$, wherein M and L are integers;

b) dividing each M-bit string into $(nx+ny+1)$ strings $mx_0, mx_1, \ldots, mx_{nx}, my_1, \ldots, my_{ny}$, wherein the length of string $mx_0$ is less than or equal to $(N-L)$ bits, the length of each of the remaining $(nx+ny)$ strings $mx_1, \ldots, mx_{nx}, my_1, \ldots, my_{ny}$ being less than or equal to N bits, wherein each of the $(nx+ny+1)$ bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $Y_1, \ldots, y_{ny}$;

e) assigning the value of the bit string of $mx_0$ to $x_0$;

f) substituting the values of $x_0, x_1, \ldots, x_{nx}$, and $y_1, \ldots, y_{ny}$ in a selected elliptic polynomial equation with $(nx+1)$ x-coordinates and $(ny+1)$ y-coordinates to form a quadratic equation in $y_0$ of the form $y_0^2+Ay_0+B=0$, wherein A and B are variable coefficients;

g) if the quadratic equation in $y_o$ has solutions $\bar{y}_{0,1}, \bar{y}_{0,2}$, wherein the solutions are elements of the finite field F, then a method agreed upon by the sending and receiving correspondent is used to select one of the solutions $\bar{y}_{0,1}, \bar{y}_{0,2}$, and further assigning the chosen solution to $y_o$, assigning $\alpha_m=1$, and the message point is given by $(x_{0,m}, x_{1,m}, \ldots, x_{nx,m}, y_{0,m}, y_{1,m}, \ldots, y_{ny,m})$, otherwise a method agreed upon by the sending and receiving correspondent is used to select one of the solutions $\sqrt{\alpha}\bar{y}_{0,1}, \sqrt{\alpha}\bar{y}_{0,2}$, and then further assign the chosen solution to $y_o$, assigning $\alpha_m = \bar{\alpha}$ and the message point is given by $(x_{0,m}, x_{1,m}, \ldots, x_{nx,m}, \sqrt{\alpha}y_{0,m}, y_{1,m}, \ldots, y_{ny,m})$; and h) denoting the message point as $(x_{0,m}, x_{1,m}, \ldots, x_{nx,m}, \sqrt{\alpha}y_{0,m}, y_{1,m}, \ldots, y_{ny,m})$.

5. A computerized method of generating an elliptic polynomial-based message authentication code, comprising the steps of:

a) defining a maximum block size that can be embedded into $(nx+1)$ x-coordinates and $ny$ y-coordinates, wherein n is an integer, and setting the maximum block size to be $(nx+ny+1)N$ bits, wherein N is an integer;

b) a sending correspondent and a receiving correspondent agree upon the values of $nx$ and $ny$, and further agree on a set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$, wherein F represents a finite field and where the elements of F are represented in N-bits, the sending and receiving correspondents further agreeing on a random number k that represents a shared secret key for communication, the sending and receiving correspondents further agreeing on a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$, wherein $EC^{nx+ny+2}$ represents the elliptic polynomial, and further agreeing on a base point on the twist of the elliptic polynomial $(x_{0,TB}, x_{1,TB}, \ldots, x_{nx,TB}, \sqrt{\bar{\alpha}}y_{0,B}, y_{1,TB}, \ldots, y_{ny,TB}) \in EC^{nx+ny+2}$, wherein $TEC^{nx+ny+2}$ represents the twist of the elliptic polynomial $EC^{nx+ny+2}$, and wherein $\bar{\alpha}$ is a non-quadratic residue element of F, the sending and receiving correspondents further agreeing on an initial vector $s_{m_{-1}}$ having a length of $(nx+ny+1)N$-bits;

the sending correspondent then performs the following steps:

c) embedding the bit string of the secret key into the $(nx+1)$ x-coordinates $x_0, x_1, \ldots, x_{nx}$, and the $ny$ y-coordinates $y_1, \ldots, y_{ny}$, of a key elliptic point $(x_{0,k}, x_{1,k}, \ldots, x_{nx,k}, \sqrt{\alpha_k}y_{0,k}, y_{1,k}, \ldots, y_{ny,k})$ using a non-iterative embedding method;

d) if $(x_{0,k}, x_{1,k}, \ldots, x_{nx,k}, \sqrt{\alpha_k}y_{0,k}, y_{1,k}, \ldots, y_{ny,k})$ is on the elliptic polynomial, a scalar multiplication is computed as $$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = k(x_{0,TB}, x_{1,TB}, \ldots, x_{nx,TB}, \sqrt{\alpha}y_{0,B}, y_{1,TB}, \ldots, y_{ny,TB})$$

and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$ otherwise, if $\alpha_k = \bar{\alpha}$, then the scalar multiplication is computed as $$(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$$ and $$(x_{0,TS_0}, x_{1,TS_0}, \ldots, x_{nx,TS_0}, \sqrt{\alpha}y_{0,TS_0}, y_{1,TS_0}, \ldots, x_{ny,TS_0}) = (x_{0,k}, x_{1,k}, \ldots, x_{nx,k}, \sqrt{\alpha}y_{0,k}, y_{1,k}, \ldots, y_{ny,k});$$

e) denoting the first $(nx+ny+1)N$-bit string of the message data to be $s_{m_0}{'}$ and computing the $(nx+ny+1)N$-bit string $s_{m_0}$ as $s_{m_0} = s_{m_0}{'} \oplus s_{m_{-1}}$;

f) dividing the message bit string into M-bit strings, where $((nx+ny+1)N-L)>M>(N-L)$, wherein M and L are integers, and embedding the message bit string of the initial block of the message bit string $s_{m_0}$ into the (nx+1) x-coordinates and ny y-coordinates of the elliptic message point $(x_{0,m_0}, x_{1,m_0}, \ldots, x_{nx,m_0}, \sqrt{\alpha_{m_0}} y_{0,m_0}, y_{1,m_0}, \ldots, y_{ny,m_0})$ using the non-iterative embedding method;

g) if the message point of the initial block is on the elliptic polynomial, then the message authentication code points are computed as:

$(x_{0,c_0}, x_{1,c_0}, \ldots, x_{nx,c_0}, y_{0,c_0}, y_{1,c_0}, \ldots, y_{ny,c_0}) = (x_{0,m_0}, x_{1,m_0}, \ldots, x_{nx,m_0}, y_{0,m_0}, y_{1,m_0}, \ldots, y_{ny,m_0}) + (x_{0,S_0}, x_{1,S_0}, \ldots, x_{nx,S_0}, y_{0,S_0}, y_{1,S_0}, \ldots, x_{ny,S_0})$ and $(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,TS_0}, x_{1,TS_0}, \ldots, x_{nx,TS_0}, \sqrt{\alpha} y_{0,TS_0}, y_{1,TS_0}, \ldots, y_{ny,TS_0})$, otherwise, they are computed as:

$(x_{0,Tc_0}, x_{1,Tc_0}, \ldots, x_{nx,Tc_0}, \sqrt{\alpha} y_{0,Tc_0}, y_{1,Tc_0}, \ldots, y_{ny,Tc_0}) = (x_{0,m_0}, x_{1,m_0}, \ldots, x_{nx,m_0}, \sqrt{\alpha} y_{0,m_0}, y_{1,m_0}, \ldots, y_{ny,m_0}) + (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$ and $(x_{0,c_0}, x_{1,c_0}, \ldots, x_{nx,c_0}, y_{0,c_0}, y_{1,c_0}, \ldots, y_{ny,c_0}) = (x_{0,S_0}, x_{1,S_0}, \ldots, x_{nx,S_0}, y_{0,S_0}, y_{1,S_0}, \ldots, x_{ny,S_0})$;

h) initializing i as i=1, and repeating the following steps i) through l) and incrementing i at each step until all of the message data blocks are processed:

i) denoting the (nx+ny+1)N-bit string of an $l^{th}$ message data to be $S_{m_i}$ and computing the (nx+ny+1)N-bit string $s_{m_i}$ as $s_{m_i} = s_{m_i}' \oplus s_{m_{i-1}}$;

j) embedding the message (nx+ny+1)N-bit string of an i-th block $S_{m_i}'$ into the (nx+1) x-coordinates $x_0, x_1, \ldots, x_{nx}$ and the ny y-coordinates, $y_1, \ldots, y_{ny}$ of the elliptic message point $(x_{0,m_i}, x_{1,m_i}, \ldots, x_{nx,m_i}, \sqrt{\alpha_{m_i}} y_{0,m_i}, y_{1,m_i}, \ldots, y_{ny,m_0})$ using the non-iterative embedding method;

k) doubling the points $(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$ as:

$(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}) = 2(x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$ and $(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}}) = 2(x_{0,Tc_{i-1}}, x_{1,Tc_{i-1}}, \ldots, x_{nx,Tc_{i-1}}, y_{0,Tc_{i-1}}, y_{1,Tc_{i-1}}, \ldots, y_{ny,Tc_{i-1}})$;

l) if the message point of the i-th block is on the elliptic polynomial, then the message authentication code points are computed as:

$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$, otherwise, they are computed as:

$(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha} y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$;

m) a set of appropriate bits of the x-coordinates $x_{0,c}, x_{1,c}, \ldots, x_{nx,c}$, y-coordinates $y_{1,c}, \ldots, y_{ny,c}$ and a sign bit of $y_{0,c}$ of the message authentication code point $(x_{0,c_u}, x_{1,c_u}, \ldots, x_{nx,c_u}, y_{0,c_u}, y_{1,c_u}, \ldots, y_{ny,c_0})$, and a set of appropriate bits of the x-coordinates $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the message authentication code point $(x_{0,Tc_u}, x_{1,Tc_u}, \ldots, x_{nx,Tc_u}, \sqrt{\alpha} y_{0,Tc_u}, y_{1,Tc_u}, \ldots, y_{ny,Tc_u})$ are concatenated together to form the message authentication code, which is then appended to the message to be sent together with, if necessary, any additional information needed to help authenticate the message bit string at the receiving correspondent without compromising security and sent to the receiving correspondent;

the receiving correspondent then performs the following steps:

n) embedding the bit string of the secret key into the (nx+1) x-coordinates $x_0, x_1, \ldots, x_{nx}$, and the ny y-coordinates $y_1, \ldots, y_{ny}$, of the key elliptic point $(x_{0,k}, x_{1,k}, \ldots, x_{nx,k}, \sqrt{\alpha_k} y_{0,k}, y_{1,k}, \ldots, y_{ny,k})$ using the non-iterative embedding method;

o) if the point $(x_{0,k}, x_{1,k}, \ldots, x_{nx,k}, \sqrt{\alpha_k} y_{0,k}, y_{1,k}, \ldots, y_{ny,k})$ is on the elliptic polynomial, then a scalar multiplication is performed as $(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = k(x_{0,TB}, x_{1,TB}, \ldots, x_{nx,TB}, \sqrt{\alpha} y_{0,B}, y_{1,TB}, \ldots, y_{ny,TB})$ and $(x_{0,S_0}, x_{1,S_0}, \ldots, x_{nx,S_0}, y_{0,S_0}, y_{1,S_0}, \ldots, x_{ny,S_0}) = (x_{0,k}, x_{1,k}, \ldots, x_{nx,k}, y_{0,k}, y_{1,k}, \ldots, y_{ny,k})$, otherwise if $\alpha_k = \alpha_o$ then the scalar multiplication is performed as $(x_{0,S_0}, x_{1,S_0}, \ldots, x_{nx,S_0}, y_{0,S_0}, y_{1,S_0}, \ldots, x_{ny,S_0}) = k(x_{0,B}, x_{1,B}, \ldots, x_{nx,B}, y_{0,B}, y_{1,B}, \ldots, y_{ny,B})$ $(x_{0,TS_0}, x_{1,TS_0}, \ldots, x_{nx,TS_0}, \sqrt{\alpha} y_{0,TS_0}, y_{1,TS_0}, \ldots, x_{ny,TS_0}) = (x_{0,k}, x_{1,k}, \ldots, x_{nx,k}, \sqrt{\alpha} y_{0,k}, y_{1,k}, \ldots, y_{ny,k})$;

p) denoting the first (nx+ny+1)N-bit string of the message data to be $s_{rm_0}'$ and computing the (nx+ny+1)N-bit string $s_{rm_0}$ as $s_{rm_0} n = s_{rm_0}' \oplus s_{rm_{-1}}$;

q) dividing the message bit string into M-bit strings where $((nx+ny+1)N-L)>M>(N-L)$, wherein M and L are integers, and embedding the message bit string of the initial block of the message bit string $s_{rm_0}$ into the (nx+1) x-coordinates and the ny y-coordinates of the received message elliptic point $(x_{0,rm_0}, x_{1,rm_0}, \ldots, x_{nx,rm_0}, \sqrt{\alpha_{rm_0}} y_{0,rm_0}, y_{1,rm_0}, \ldots, y_{ny,rm_0})$ using the non-iterative embedding method;

r) if the message point of the 0-th block is on the elliptic-polynomial, then the message authentication points are computed as:

$(x_{0,rc_0}, x_{1,rc_0}, \ldots, x_{nx,rc_0}, y_{0,rc_0}, y_{1,rc_0}, \ldots, y_{ny,rc_0}) = (x_{0,rm_0}, x_{1,rm_0}, \ldots, x_{nx,rm_0}, y_{0,rm_0}, y_{1,rm_0}, \ldots, y_{ny,rm_0}) + (x_{0,S_0}, x_{1,S_0}, \ldots, x_{nx,S_0}, y_{0,S_0}, y_{1,S_0}, \ldots, x_{ny,S_0})$ and $(x_{0,rTc_0}, x_{1,rTc_0}, \ldots, x_{nx,rTc_0}, \sqrt{\alpha} y_{0,rTc_0}, y_{1,rTc_0}, \ldots, y_{ny,rTc_0}) = (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$ otherwise they are computed as:

$(x_{0,rTc_0}, x_{1,rTc_0}, \ldots, x_{nx,rTc_0}, \sqrt{\alpha} y_{0,rTc_0}, y_{1,rTc_0}, \ldots, y_{ny,rTc_0}) = (x_{0,rm_0}, x_{1,rm_0}, \ldots, x_{nx,rm_0}, \sqrt{\alpha} y_{0,rm_0}, y_{1,rm_0}, \ldots, y_{ny,rm_0}) + (x_{0,TS_0}, x_{1,TS_0}, \ldots, x_{nx,TS_0}, \sqrt{\alpha} y_{0,TS_0}, y_{1,TS_0}, \ldots, x_{ny,TS_0})$ and $(x_{0,rc_0}, x_{1,rc_0}, \ldots, x_{nx,rc_0}, y_{0,rc_0}, y_{1,rc_0}, \ldots, y_{ny,rc_0}) = (x_{0,S_0}, x_{1,S_0}, \ldots, x_{nx,S_0}, y_{0,S_0}, y_{1,S_0}, \ldots, x_{ny,S_0})$;

s) initializing the integer i as i=0, and repeating the following steps t) through w) and incrementing i at each step until all of the message data blocks are processed:

t) denoting the (nx+ny+1)N-bit string of an $l^{th}$ message data to be $s_{rm_i}'$ and computing the (nx+ny+1)N-bit string $s_{rm_i}$ as $s_{rm_i} = s_{rm_i}' \oplus s_{rm_{i-1}}$;

u) embedding the received message (nx+ny+1)N-bit string of the i-th block $s_{rm_i}$ the into the (nx+1) x-coordinates $x_0, x_1, \ldots, x_{nx}$, and the ny y-coordinates $y_1, \ldots, y_{ny}$, of the received message elliptic point $(x_{0,rm_i}, x_{1,rm_i}, \ldots, x_{nx,rm_i}, \sqrt{\alpha_{rm_i}}y_{0,rm_i}, y_{1,rm_i}, \ldots, y_{ny,rm_i})$ using the non-iterative embedding method;

v) doubling the points $(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}})$ and $(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}})$ as:

$$(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}}) = 2(x_{0,rc_{i-1}}, x_{1,rc_{i-1}}, \ldots, x_{nx,rc_{i-1}}, y_{0,rc_{i-1}}, y_{1,rc_{i-1}}, \ldots, y_{ny,rc_{i-1}})$$

$$(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}}) = 2(x_{0,rTc_{i-1}}, x_{1,rTc_{i-1}}, \ldots, x_{nx,rTc_{i-1}}, y_{0,rTc_{i-1}}, y_{1,rTc_{i-1}}, \ldots, y_{ny,rTc_{i-1}});$$

w) if the received message point of the i-th block is on the elliptic polynomial, then the message authentication points are computed as $$(x_{0,rc_i}, x_{1,rc_i}, \ldots, x_{nx,rc_i}, y_{0,rc_i}, y_{1,rc_i}, \ldots, y_{ny,rc_i}) = (x_{0,rm_i}, x_{1,rm_i}, \ldots, x_{nx,rm_i}, y_{0,rm_i}, y_{1,rm_i}, \ldots, y_{ny,rm_i}) + (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}})$$

and $(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$, otherwise, they are computed as:

$$(x_{0,rTc_i}, x_{1,rTc_i}, \ldots, x_{nx,rTc_i}, \sqrt{\alpha}y_{0,rTc_i}, y_{1,rTc_i}, \ldots, y_{ny,rTc_i}) = (x_{0,rm_i}, x_{1,rm_i}, \ldots, x_{nx,rm_i}, \sqrt{\alpha}y_{0,rm_i}, y_{1,rm_i}, \ldots, y_{ny,rm_i}) + (x_{0,rTc_{i-1}}, x_{1,rTc_{i-1}}, \ldots, x_{nx,rTc_{i-1}}, \sqrt{\alpha}y_{0,rTc_{i-1}}, y_{1,rTc_{i-1}}, \ldots, x_{ny,rTc_{i-1}})$$ and $$(x_{0,rc_i}, x_{1,rc_i}, \ldots, x_{nx,rc_i}, y_{0,rc_i}, y_{1,rc_i}, \ldots, y_{ny,rc_i}) = (x_{0,rc_{i-1}}, x_{1,rc_{i-1}}, \ldots, x_{nx,rc_{i-1}}, y_{0,rc_{i-1}}, y_{1,rc_i}, \ldots, x_{ny,rc_{i-1}});$$

x) the appropriate bits of the x-coordinates $x_{0,rc}, x_{1,rc}, \ldots, x_{nx,rc}$, y-coordinates $y_{1,rc}, \ldots, y_{ny,rc}$ and the sign bit of $y_{0,rc}$ of the message authentication code point $(x_{0,rc_u}, x_{1,rc_u}, \ldots, x_{nx,rc_u}, y_{0,rc_u}, y_{1,rc_u}, \ldots, y_{ny,rc_0})$ and the appropriate bits of the x-coordinates $x_{0,rTc}, x_{1,rTc}, \ldots, x_{nx,rTc}$, y-coordinates $y_{1,rTc}, \ldots, y_{ny,rTc}$ and the sign bit of $y_{0,rTc}$ of the message authentication point $(x_{0,rTc_u}, x_{1,rTc_u}, \ldots, x_{nx,rTc_u}, \sqrt{\alpha}y_{0,rTc_u}, y_{1,rTc_u}, \ldots, y_{ny,rTc_u})$ are concatenated together to form the message authentication code of the received message; and y) if the received message authentication code is equal to the message authentication code of the received message generated at the receiving correspondent, the received message is authenticated.

6. The computerized method of generating an elliptic polynomial-based message authentication code as recited in claim 5, wherein the non-iterative embedding method comprises the steps of:

a) dividing the message bit string into M-bit strings where $((nx+ny+1)N-L) > M > (N-L)$, wherein M and L are integers;

b) dividing each M-bit string into $(nx+ny+1)$ strings $mx_0, mx_1, \ldots, mx_{nx}, my_1, \ldots, my_{ny}$, wherein the length of string $mx_0$ is less than or equal to $(N-L)$ bits, the length of each of the remaining $(nx+ny)$ strings $mx_1, \ldots, mx_{nx}, my_1, \ldots, my_{ny}$ being less than or equal to N bits, wherein each of the $(nx+ny+1)$ bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1 \ldots y_{ny}$;

e) assigning the value of the bit string of $mx_0$ to $x_0$;

f) substituting the values of $x_0, x_1, \ldots, x_{nx}$ and $y_1, \ldots, y_{ny}$ in a selected elliptic polynomial equation with $(nx+1)$ x-coordinates and $(ny+1)$ y-coordinates to form a quadratic equation in $y_0$ of the form $y_0^2 + Ay_0 + B = 0$, wherein A and B are variable coefficients;

g) if the quadratic equation in $y_o$ has solutions $\bar{y}_{0,1}, \bar{y}_{0,2}$, wherein the solutions are elements of the finite field F, then a method agreed upon by the sending and receiving correspondent is used to select one of the solutions $\bar{y}_{0,1}, \bar{y}_{0,2}$, and further assigning the chosen solution to $y_o$, assigning $\alpha_m = 1$, and the message point is given by $(x_{0,m}, x_{1,m}, \ldots, x_{nx,m}, y_{0,m}, y_{1,m}, \ldots, y_{ny,m})$, otherwise a method agreed upon by the sending and receiving correspondent is used to select one of the solutions $\sqrt{\overline{\alpha}}\bar{y}_{0,1}, \sqrt{\overline{\alpha}}\bar{y}_{0,2}$, and then further assign the chosen solution to $y_o$, assigning $\alpha_m = \overline{\alpha}$ and the message point is given by $(x_{0,m}, x_{1,m}, \ldots, x_{nx,m}, \sqrt{\overline{\alpha}}y_0, y_{1,m}, \ldots, y_{ny,m})$; and h) denoting the message point as $(x_{0,m}, x_{1,m}, \ldots, x_{nx,m}, \sqrt{\overline{\alpha}}y_{0,m}, y_{1,m}, \ldots, y_{ny,m})$.

* * * * *